United States Patent
Hayashi et al.

(10) Patent No.: US 8,718,904 B2
(45) Date of Patent: May 6, 2014

(54) AUTOMATIC STOP AND RESTART DEVICE FOR AN ENGINE

(71) Applicant: Mitsubishi Electric Corporation, Tokyo (JP)

(72) Inventors: Kensuke Hayashi, Tokyo (JP); Osamu Ishikawa, Tokyo (JP); Tomohisa Shoda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/945,027

(22) Filed: Jul. 18, 2013

(65) Prior Publication Data

US 2014/0011637 A1      Jan. 9, 2014

Related U.S. Application Data

(62) Division of application No. 12/957,956, filed on Dec. 1, 2010.

(30) Foreign Application Priority Data

Apr. 28, 2010   (JP) .................................. 2010-102936

(51) Int. Cl.
    *F02N 11/08*   (2006.01)
(52) U.S. Cl.
    USPC ....................... 701/112; 123/179.1; 123/179.4
(58) Field of Classification Search
    CPC . F02N 11/08; F02N 11/0814; F02N 11/0818; F02N 11/0822; F02N 2200/0802
    USPC .................... 123/179.1, 179.4; 701/112, 113
    See application file for complete search history.

(56) References Cited

U.S. PATENT DOCUMENTS

| | | | |
|---|---|---|---|
| 6,504,259 B1 * | 1/2003 | Kuroda et al. | 290/40 C |
| 8,069,832 B2 * | 12/2011 | Okumoto et al. | 123/179.4 |
| 8,171,908 B2 * | 5/2012 | Senda et al. | 123/179.4 |
| 8,246,517 B2 * | 8/2012 | Senda et al. | 477/121 |
| 2008/0172170 A1 * | 7/2008 | Lecole et al. | 701/113 |
| 2010/0132647 A1 * | 6/2010 | Dietrich | 123/179.3 |
| 2010/0251852 A1 * | 10/2010 | Murata et al. | 74/7 A |
| 2013/0141192 A1 * | 6/2013 | Neet et al. | 335/126 |
| 2013/0179055 A1 * | 7/2013 | Kato et al. | 701/113 |

FOREIGN PATENT DOCUMENTS

JP            4214401 B2       12/2005

* cited by examiner

*Primary Examiner* — Stephen K Cronin
*Assistant Examiner* — Elizabeth Hadley
(74) *Attorney, Agent, or Firm* — Sughrue Mion, PLLC

(57) ABSTRACT

Provided is an automatic stop and restart device for an engine that is capable of suppressing occurrence of an abnormal condition even if a transmission state is changed during an engine restart process after an engine restart condition is satisfied in an automatic engine stop process. A controller performs the automatic engine stop process and the engine restart process. If a determined state of a transmission is a drive range, a transmission state determination unit drives a pinion gear thrust unit at timing determined by a first pinion gear thrust timing determination unit. If the determined state of the transmission is a non-drive range, the transmission state determination unit drives the pinion gear thrust unit at timing determined by a second pinion gear thrust timing determination unit.

1 Claim, 32 Drawing Sheets

AUTOMATIC STOP AND RESTART DEVICE FOR AN ENGINE

CROSS-REFERENCE TO RELATED APPLICATION

This application is a divisional of U.S. application Ser. No. 12/957,956 filed Dec. 1, 2010, which is the disclosure of which is incorporated herein by reference in its entirety.

BACKGROUND OF THE INVENTION

1. Field of the Invention

The present invention relates to an automatic stop and restart device for an engine, which stops an engine automatically when a predetermined automatic engine stop condition is satisfied and restarts the engine when a predetermined restart condition is satisfied after the automatic engine stop condition is satisfied.

2. Description of the Related Art

In recent years, there are developed automatic engine stop and restart systems which stop an engine automatically and then restart the engine automatically for a purpose of improving fuel efficiency of automobiles or decreasing environmental load. The automatic engine stop and restart system automatically stops the engine if a predetermined automatic engine stop condition for stopping the engine is satisfied by a driver's operation (e.g., if a brake operation is performed at vehicle speed under a predetermined speed). In addition, the automatic engine stop and restart system automatically restarts the engine if a predetermined restart condition is satisfied by a driver's operation (e.g., if a brake releasing operation or a gas pedal depressing operation is performed).

For instance, Japanese Patent No. 4214401 discloses a conventional device in which, if a request for restart is issued during a period of decreasing engine rotation just after idle stop, a controller starts a cranking operation without waiting for the engine rotation being completely stopped. More specifically, in this conventional device, if a request for restart is issued during a period of decreasing engine rotation just after idle stop, the controller controls a starter pinion gear to rotate. Further, when the rotation speed of the starter pinion gear is synchronized with a predicted rotation speed of a ring gear, the controller controls the starter pinion gear to engage with the ring gear so as to start the cranking operation.

Next, operation timings of the conventional device as disclosed in Japanese Patent No. 4214401 are described with reference to a timing chart illustrated in FIG. 31. In FIG. 31, a ring gear rotation speed is represented by reference numeral 1001; a pinion gear rotation speed, 1002; a starter drive signal, 1003; and a pinion gear thrust signal, 1004. An automatic engine stop condition is satisfied at time t1, and the controller starts the engine stop process. After that, an engine restart condition is satisfied at time t2, and the controller turns on the starter drive signal so that the pinion gear starts to rotate.

Further, at time t3, it is predicted that the ring gear rotation speed and the pinion gear rotation speed are synchronized with each other after a pinion gear abutment delay time ΔT. Therefore, the controller turns on the pinion gear thrust signal. At time t4, the ring gear rotation speed and the pinion gear rotation speed are synchronized with each other. At the same time, the pinion gear abuts against and engages with the ring gear. After that, the controller controls the pinion gear to rotate and drives the ring gear so that the engine is cranked and is restarted.

In the conventional device as disclosed in Japanese Patent No. 4214401, the controller predicts the ring gear rotation speed in the future and controls timing to thrust the pinion gear in synchronization with the timing when it is predicted that the pinion gear rotation speed and the ring gear rotation speed are synchronized with each other. However, the conventional device as disclosed in Japanese Patent No. 4214401 considers nothing about the case where the driver selects the non-drive range during the engine restart process.

Therefore, in this case, a ring gear rotation speed decrease amount in the non-drive range is different from a ring gear rotation speed decrease amount in the drive range. Therefore, the pinion gear rotation speed and the ring gear rotation speed cannot be synchronized at a time point of abutment, and the pinion gear is pressed to the ring gear in the state where the gears cannot engage with each other. As a result, in the conventional device as disclosed in Japanese Patent No. 4214401, there is a risk that noise is generated or a mechanism is broken.

The above-mentioned problem of the conventional device as disclosed in Japanese Patent No. 4214401 is described with reference to a timing chart illustrated in FIG. 32. In FIG. 32, the ring gear rotation speed is represented by reference numeral 1001; the pinion gear rotation speed, 1002; the starter drive signal, 1003; the pinion gear thrust signal, 1004; and a transmission state, 1005. At a time point t1, the automatic engine stop condition is satisfied, and the controller starts the engine stop process.

After that, at a time point t2, the engine restart condition is satisfied. Therefore, the controller turns on the starter drive signal so as to control the pinion gear to start rotating. Then, at a time point t3, the controller predicts that the ring gear rotation speed and the pinion gear rotation speed are synchronized with each other after the pinion gear abutment delay time ΔT and turns on the pinion gear thrust signal.

At a time point t4, the transmission state is changed from a D range to an N range, and hence the ring gear rotation speed decrease amount changes. As a result, at a time point t5, the ring gear and the pinion gear abut against each other but cannot engage with each other because the ring gear rotation speed and the pinion gear rotation speed are not synchronized with each other. Therefore, noise may be generated or the mechanism may be broken.

SUMMARY OF THE INVENTION

The present invention has been made for solving the above-mentioned problem, and an object thereof is to provide an automatic stop and restart device for an engine that is capable of suppressing occurrence of an abnormal condition such as noise or a breakdown even if an engine restart condition is satisfied in an automatic engine stop process and a transmission state is changed during an engine restart process thereafter.

According to the present invention, there is provided an automatic stop and restart device for an engine that is disposed in a start and transmission system of a vehicle which includes: a transmission for changing gears to transmit power of the engine to driving wheels of the vehicle; a transmission operation device for receiving an external transmission operation to operate a transmission state of the transmission; a ring gear that is provided to a crank shaft of the engine, a starter motor for starting the engine; a pinion gear that is capable of approaching and separating from the ring gear and is driven by the starter motor to rotate; pinion gear thrust means for thrusting the pinion gear to the ring gear so that the pinion gear engages with the ring gear to crank the engine; and ring gear rotation speed detection means for detecting a ring gear rotation speed, the automatic stop and restart device including a controller which includes transmission state determination means for determining whether the transmission is in a drive range or in a non-drive range, the controller performing an automatic stop process for the engine if a predetermined automatic engine stop condition is satisfied, and a restart process for the engine by controlling drive of the starter motor and the pinion gear thrust means if a predetermined restart condition is satisfied after the predetermined automatic engine stop condition is satisfied, in which the controller further includes: starter drive time measurement means for measuring starter motor drive time from a time point when the drive of the starter motor is started; pinion gear rotation speed estimation means for estimating a pinion gear rotation speed based on the starter motor drive time; first pinion gear thrust timing determination means for driving the pinion gear thrust means at timing when a difference between the ring gear rotation speed and the pinion gear rotation speed in a case where the transmission is in the drive range becomes a first predetermined value corresponding to a speed decrease amount of the ring gear rotation speed in the case where the transmission is in the drive range; and second pinion gear thrust timing determination means for driving the pinion gear thrust means at timing when a difference between the ring gear rotation speed and the pinion gear rotation speed in a case where the transmission is in the non-drive range becomes a second predetermined value corresponding to a speed decrease amount of the ring gear rotation speed in the case where the transmission is in the non-drive range.

According to the automatic stop and restart device for an engine of the present invention, the controller includes the first pinion gear thrust timing determination means for driving the pinion gear thrust means at the timing when the difference between the ring gear rotation speed and the pinion gear rotation speed in the case where the transmission is in the drive range becomes the first predetermined value corresponding to the speed decrease amount of the ring gear rotation speed in the case where the transmission is in the drive range, and the second pinion gear thrust timing determination means for driving the pinion gear thrust means at the timing when the difference between the ring gear rotation speed and the pinion gear rotation speed in the case where the transmission is in the non-drive range becomes the second predetermined value corresponding to the speed decrease amount of the ring gear rotation speed in the case where the transmission is in the non-drive range. Therefore, the pinion gear does not abut against the ring gear in the state where the ring gear rotation speed and the pinion gear rotation speed are not synchronized with each other. Thus, even if the engine restart condition is satisfied during the automatic engine stop process and the transmission state is changed during the engine restart process thereafter, occurrence of an abnormal condition such as noise or a breakdown can be suppressed.

DETAILED DESCRIPTION OF THE PREFERRED EMBODIMENTS

Hereinafter, embodiments of the present invention are described with reference to the attached drawings.

Embodiment 1

Figure 1:
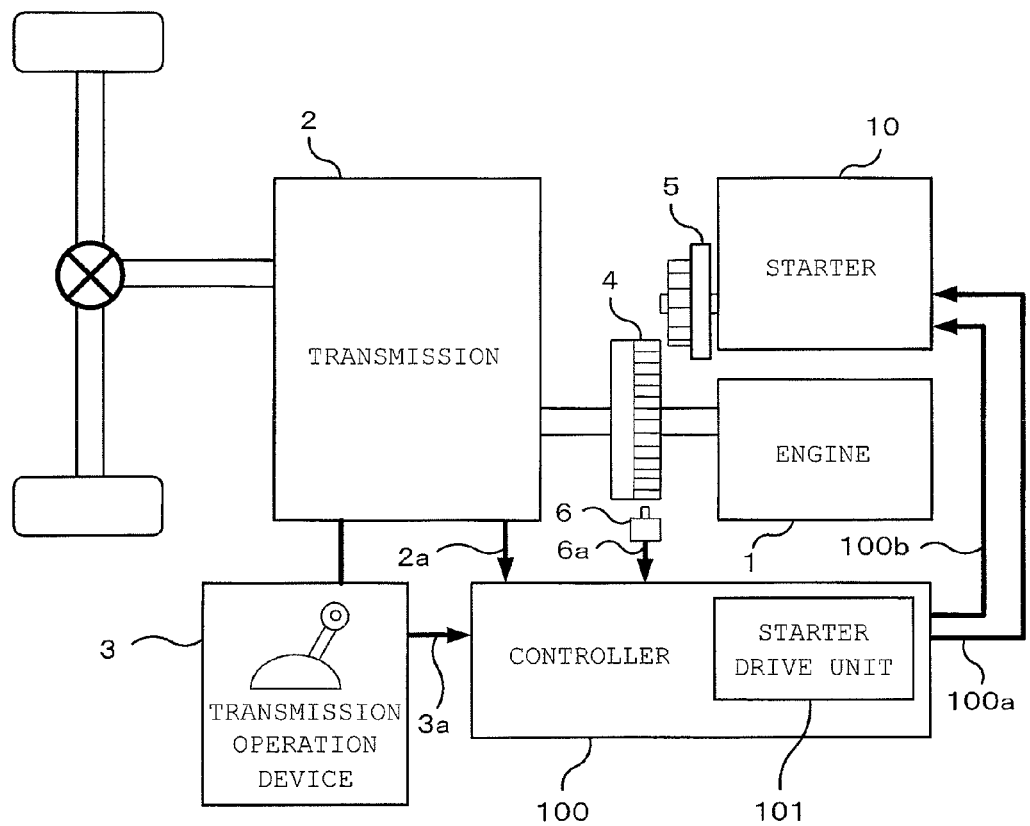
FIG. 1 is a configuration diagram illustrating an automatic stop and restart device for an engine according to Embodiment 1 of the present invention.

FIG. 1 is a configuration diagram illustrating an automatic stop and restart device for an engine according to Embodiment 1 of the present invention.

In FIG. 1, a crank shaft of an engine (internal-combustion engine) 1 to be a source of power for a vehicle is connected to a transmission 2. The transmission 2 changes gears and transmits power of the engine 1 after changing gears. The driveline of the engine 1 is transmitted to driving wheels of the vehicle. The transmission 2 is connected to a transmission operation device 3. The transmission operation device 3 changes a transmission state (gear shift) of the transmission 2 in accordance with driver's transmission operation (lever operation or shift operation).

In addition, the crank shaft of the engine 1 is provided with a ring gear 4 that rotates together with the crank shaft. Near the ring gear 4, there are disposed a pinion gear 5 that can engage with the ring gear 4 and ring gear rotation speed detection means 6 that generates a ring gear rotation detection signal 6a that corresponds to a rotation speed of the ring gear 4 (hereinafter also referred to as "ring gear rotation speed").

The pinion gear 5 can move in the direction of approaching or separating from the ring gear 4. In addition, the pinion gear 5 is connected to a starter 10. The pinion gear 5 is driven by the starter 10 to rotate. In other words, if the pinion gear 5 engages with the ring gear 4, the engine 1 is cranked when the pinion gear 5 is driven by the starter 10 to rotate.

The transmission 2, the transmission operation device 3, the ring gear rotation speed detection means 6, and the starter 10 are electrically connected to the controller 100. The controller 100 performs an automatic stop process for the engine 1 if a predetermined automatic engine stop condition is satisfied, and after that, if a predetermined restart condition is satisfied, the controller 100 performs a restart process for the engine 1. In other words, the controller 100 performs an automatic engine stop and restart process. In addition, the controller 100 includes starter drive unit (starter driving circuit) 101 for driving the starter 10.

In addition, the controller 100 receives a transmission state signal 2a that is a signal indicating a transmission state of the transmission 2 from the transmission 2. In addition, the controller 100 receives a transmission operation state signal 3a that is a signal indicating a state of the transmission operation device 3 (lever position) from the transmission operation device 3. Further, the controller 100 receives the ring gear rotation detection signal 6a from the ring gear rotation speed detection means 6. Note that the controller 100 may control the transmission state of the transmission 2 in accordance with a transmission operation of the transmission operation device 3 by the driver.

Figure 2:
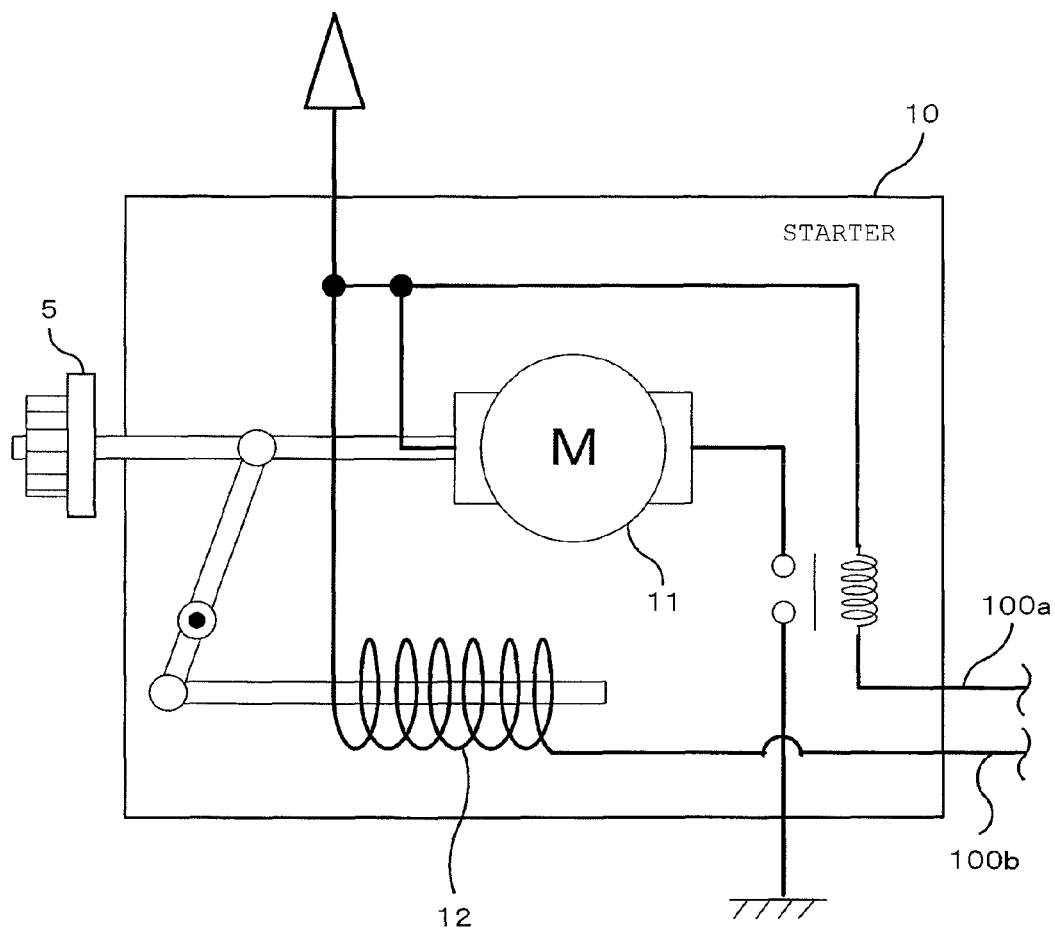
FIG. 2 is a configuration diagram illustrating a starter illustrated in FIG. 1.

Next, a configuration of the starter 10 is described more specifically. FIG. 2 is a configuration diagram illustrating the starter 10 illustrated in FIG. 1. In FIG. 2, the starter 10 includes a starter motor 11 that drives the pinion gear 5 to rotate, and pinion gear thrust means 12 that moves the pinion gear 5 in the direction of approaching or separating from the ring gear 4.

The drive of the starter motor 11 is controlled by a starter drive signal 100a from the controller 100 (starter drive unit 101) (if the signal 100a is ON, the starter motor 11 is driven). The drive of the pinion gear thrust means 12 is controlled by a pinion gear thrust signal 100b from the controller 100 (if the signal 100b is ON, the pinion gear 5 is thrusted).

Here, the transmission 2, the transmission operation device 3, the ring gear 4, the pinion gear 5, the starter motor 11, the pinion gear thrust means 12, and the ring gear rotation speed detection means 6 constitute a start and transmission system of the vehicle.

Figure 3:
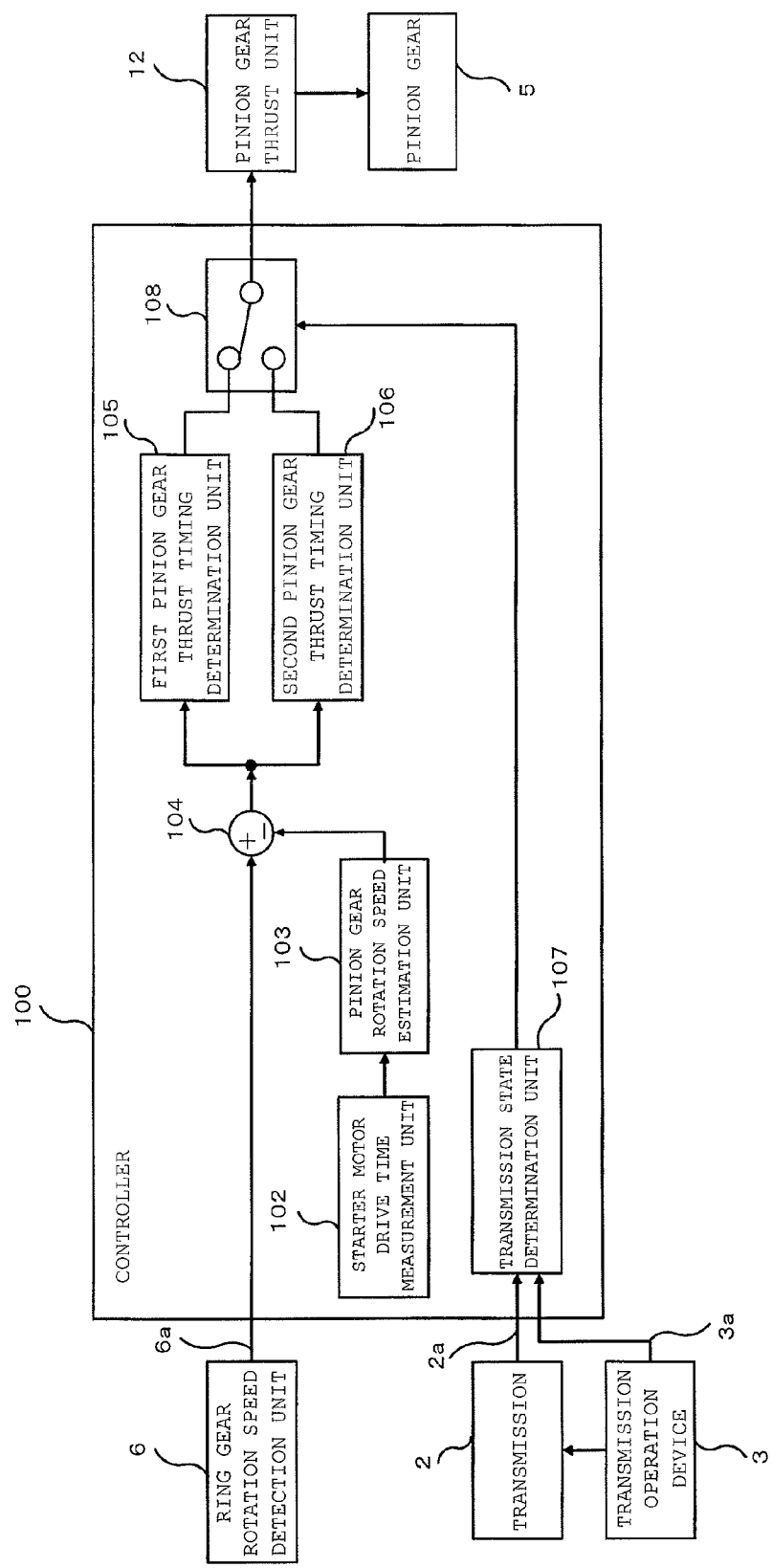
FIG. 3 is a block diagram illustrating a controller illustrated in FIG. 1.

Next, a configuration of the controller 100 is described more specifically. FIG. 3 is a block diagram illustrating the controller 100 illustrated in FIG. 1. Note that the starter drive unit 101 is omitted in FIG. 3. In FIG. 3, the controller 100 includes starter motor drive time measurement means 102, pinion gear rotation speed estimation means 103, a subtractor 104, first pinion gear thrust timing determination means 105, second pinion gear thrust timing determination means 106, transmission state determination means 107, and a state selection switch 108.

The starter motor drive time measurement means 102 measures starter motor drive time that is drive time from start of driving the starter motor 11. The pinion gear rotation speed estimation means 103 estimates a rotation speed of the pinion gear 5 (hereinafter also referred to as "pinion gear rotation speed") based on the starter motor drive time measured by the starter motor drive time measurement means 102.

The subtractor 104 subtracts the rotation speed of the pinion gear 5 estimated by the pinion gear rotation speed estimation means 103 from the rotation speed of the ring gear 4 of the ring gear rotation detection signal 6a. In other words, the subtractor 104 calculates a rotation speed difference between the ring gear 4 and the pinion gear 5 (hereinafter referred to as a "difference between the ring gear rotation speed and the pinion gear rotation speed").

The first pinion gear thrust timing determination means 105 determines a thrust timing of the pinion gear 5 based on the rotation speed difference between the ring gear 4 and the pinion gear 5 calculated by the subtractor 104. The second pinion gear thrust timing determination means 106 determines a thrust timing of the pinion gear 5, similarly to the first pinion gear thrust timing determination means 105, based on the rotation speed difference between the ring gear 4 and the pinion gear 5 calculated by the subtractor 104.

The transmission state determination means 107 monitors states of the transmission 2 and the transmission operation device 3 using the transmission state signal 2a and the transmission operation state signal 3a, so as to determine a state of the transmission 2. In addition, the transmission state determination means 107 switches contacts of the state selection switch 108 in accordance with the determined state of the transmission 2.

Specifically, if the determined state of the transmission 2 is a drive range (hereinafter also referred to as a "D range"), the transmission state determination means 107 switches contacts of the state selection switch 108 so as to drive the pinion gear thrust means 12 at a timing determined by the first pinion gear thrust timing determination means 105. If the determined state of the transmission 2 is a non-drive range (hereinafter also referred to as an "N range"), the transmission state determination means 107 switches contacts of the state selection switch 108 so as to drive the pinion gear thrust means 12 at a timing determined by the second pinion gear thrust timing determination means 106.

Here, the controller 100 may include a computer (not shown) including processing unit (CPU), storage unit (ROM, RAM, or the like), and signal input and output unit. The storage means of the computer of the controller 100 stores programs for realizing functions of the starter drive unit 101, the starter motor drive time measurement means 102, the pinion gear rotation speed estimation means 103, the subtractor 104, the first pinion gear thrust timing determination means 105, the second pinion gear thrust timing determination means 106, the transmission state determination means 107, and the state selection switch 108.

Figure 4:
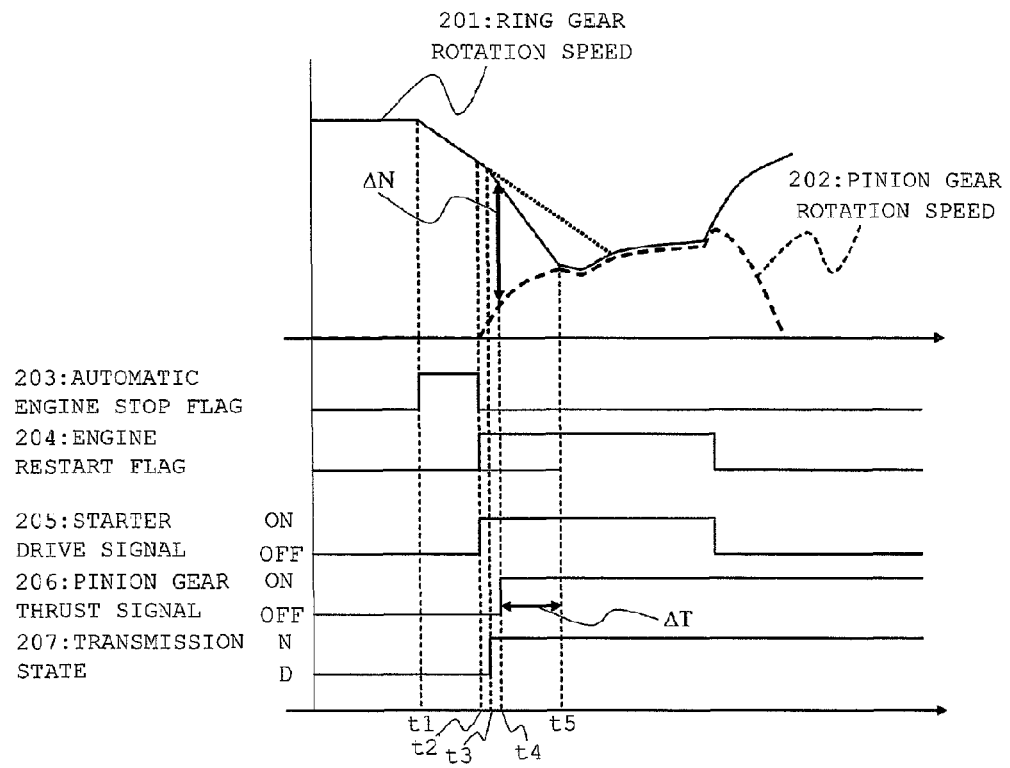
FIG. 4 is a timing chart illustrating operation timings of an automatic engine stop and restart process by the controller illustrated in FIG. 1.

Next, operation timings of the controller 100 are described. FIG. 4 is a timing chart illustrating operation timings of the automatic engine stop and restart process of the controller 100 illustrated in FIG. 1. In FIG. 4, the ring gear rotation speed is represented by reference numeral 201; and the pinion gear rotation speed, 202. In addition, an automatic engine stop flag indicating that the automatic engine stop condition is satisfied is represented by reference numeral 203, and an engine restart flag indicating that an engine restart condition is satisfied, 204. Further, the starter drive signal 100a, 205; the pinion gear thrust signal 100b, 206; and the transmission state, 207.

First, at a time point t1, the automatic engine stop condition is satisfied, and the controller 100 starts a stop process for the engine 1. After that, the engine restart condition is satisfied at a time point t2. As a result, the controller 100 turn on the starter drive signal 100a so as to start the pinion gear 5 to rotate.

At a time point t3, the transmission state is changed from the drive range to the non-drive range. As a result, decrease ratio of the engine rotation speed increases or decreases from the decrease ratio in the case of the drive range. Note that if the transmission state is not changed from the drive range to the non-drive range at the time point t3, the ring gear rotation speed 201 indicates decreasing characteristic as illustrated by a broken line in FIG. 4.

At a time point t4, a difference $\Delta N$ between the ring gear rotation speed and the pinion gear rotation speed becomes equal to a predetermined value (predetermined speed difference). Therefore, the controller 100 predicts that the ring gear rotation speed and the pinion gear rotation speed are synchronized with each other after a pinion gear abutment delay time $\Delta T$, and turns on the pinion gear thrust signal 100b.

Then, at time point t5, the ring gear rotation speed and the pinion gear rotation speed are synchronized with each other, and simultaneously the pinion gear 5 abuts against the ring gear 4 so that the pinion gear 5 engages with the ring gear 4. After that, the controller 100 controls the pinion gear 5 to rotate so as to drive the ring gear 4. Then, the engine 1 is cranked so that the engine 1 can be restarted.

Figure 5:
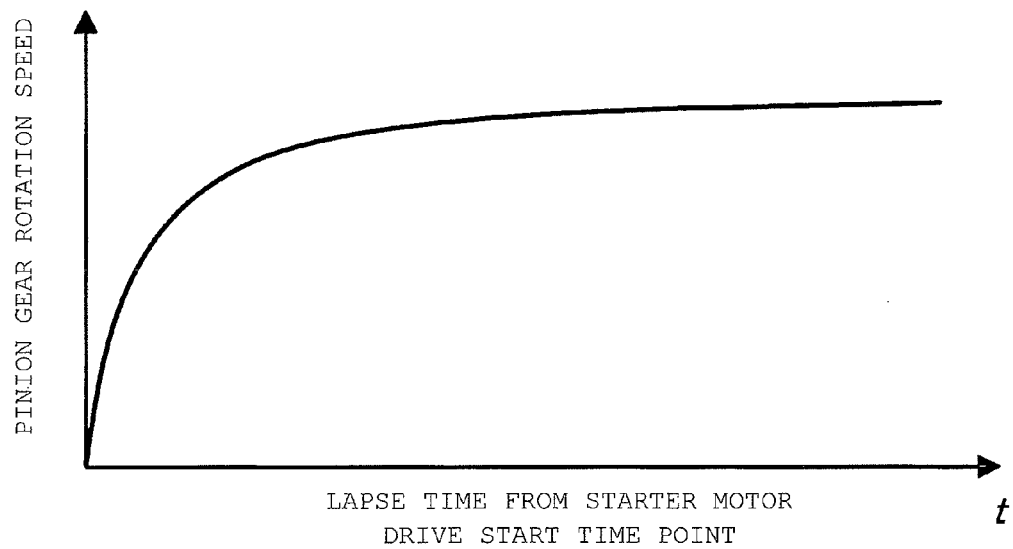
FIG. 5 is a graph illustrating a map for estimating a pinion gear rotation speed.

Here, the pinion gear abutment delay time $\Delta T$ can be determined experimentally in advance and can be stored in the controller 100 in advance. For instance, it is possible to make settings so that the pinion gear thrust change quantity can be detected and to define time necessary for the pinion gear thrust change quantity to become constant after the pinion gear thrust signal 100b is turned on as the pinion gear abutment delay time $\Delta T$. In addition, the controller 100 refers to a map as illustrated in FIG. 5 that is stored in the controller 100 in advance, and hence a pinion gear rotation speed corresponding to lapse the time from the time point of the start of driving the starter is estimated.

In this way, the controller 100 can estimate a current pinion gear rotation speed and a pinion gear rotation speed increase amount $\Delta N_P$ in the pinion gear abutment delay time $\Delta T$ from the present. In the same manner as this, a speed decrease amount of the ring gear rotation speed while the engine is stopped and the D range is selected and a speed decrease amount of the ring gear rotation speed while the engine is stopped and the N range is selected may be determined in advance, and these speed decrease amounts may be stored in the controller 100 in advance. Thus, a ring gear rotation speed decrease amount $\Delta N_{ED}$ after the pinion gear abutment delay time $\Delta T$ has passed when the D range is selected and a ring gear rotation speed decrease amount $\Delta N_{En}$ after the pinion gear abutment delay time $\Delta T$ has passed when the N range is selected can be estimated.

In the case where a difference $\Delta N$ between the current ring gear rotation speed and the pinion gear rotation speed becomes equal to a sum of the pinion gear rotation speed increase amount $\Delta N_P$ after the pinion gear abutment delay time $\Delta T$ has passed and the ring gear rotation speed decrease amount $\Delta N_{EN}$ after the pinion gear abutment delay time $\Delta T$ has passed when the N range is selected, which are estimated as described above, when the controller 100 starts to thrust the pinion gear 5, the pinion gear rotation speed and the ring gear rotation speed can be synchronized with each other at the timing when the pinion gear 5 and the ring gear 4 abut against each other. Note that the same is true for the case where the D range is selected.

Figure 6:
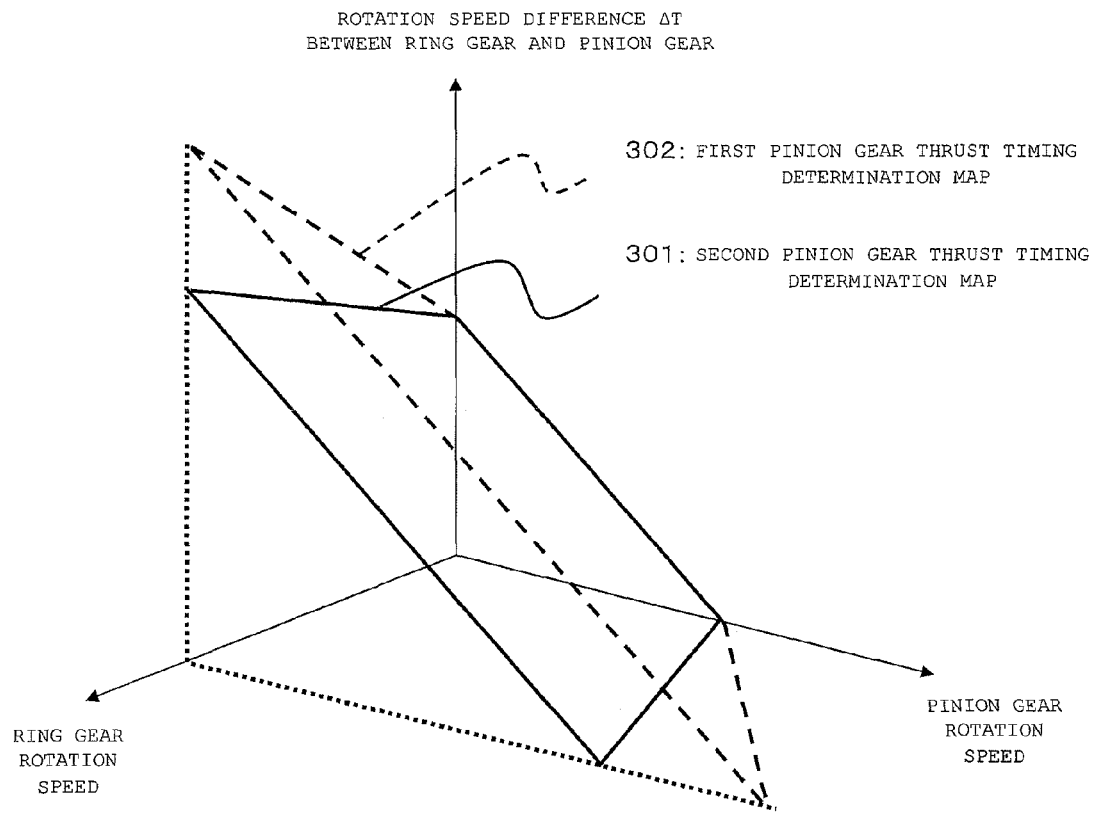
FIG. 6 is a graph illustrating a map for determining a pinion gear thrust timing.

In addition, the first pinion gear thrust timing determination means 105 and the second pinion gear thrust timing determination means 106 my refer to the map as illustrated in FIG. 6 based on the ring gear rotation speed and the pinion gear rotation speed so that the pinion gear thrust timing is determined.

In FIG. 6, a first pinion gear thrust timing determination map that is used by the first pinion gear thrust timing determination means 105 when the transmission state is the D range is represented by reference numeral 301; and a second pinion gear thrust timing determination map that is used by the second pinion gear thrust timing determination means 106 when the transmission state is the N range, 302.

Therefore, the first pinion gear thrust timing determination means 105 determines the pinion gear thrust timing corresponding to the speed decrease amount of the ring gear rotation speed when the transmission 2 is in the drive range (D range). In contrast, the second pinion gear thrust timing determination means 106 determines the pinion gear thrust timing corresponding to the speed decrease amount of the ring gear rotation speed when the transmission 2 is in the non-drive range (N range).

Figure 7:
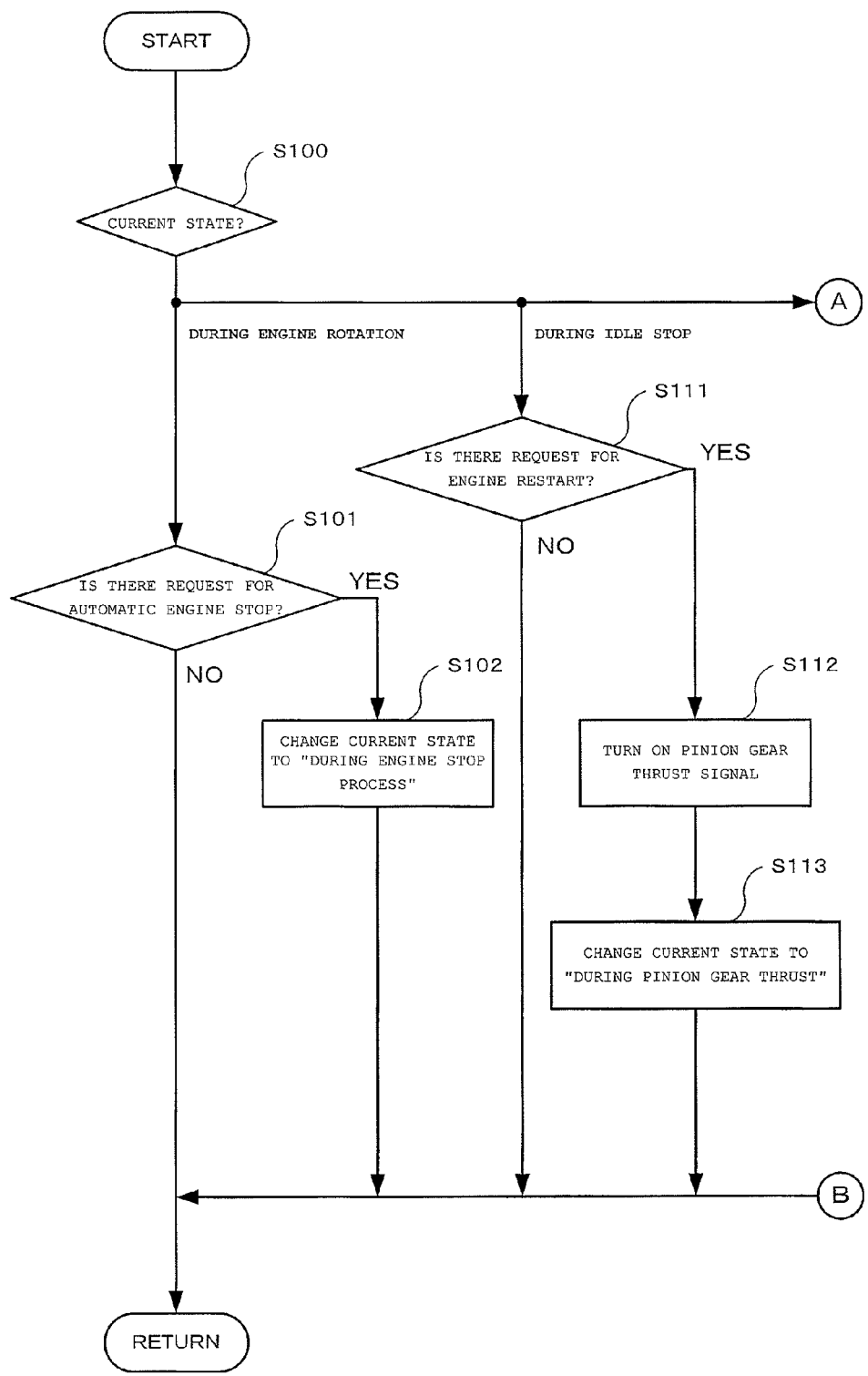
FIG. 7 is a flowchart illustrating an operation of the controller illustrated in FIG. 1.
Figure 8:
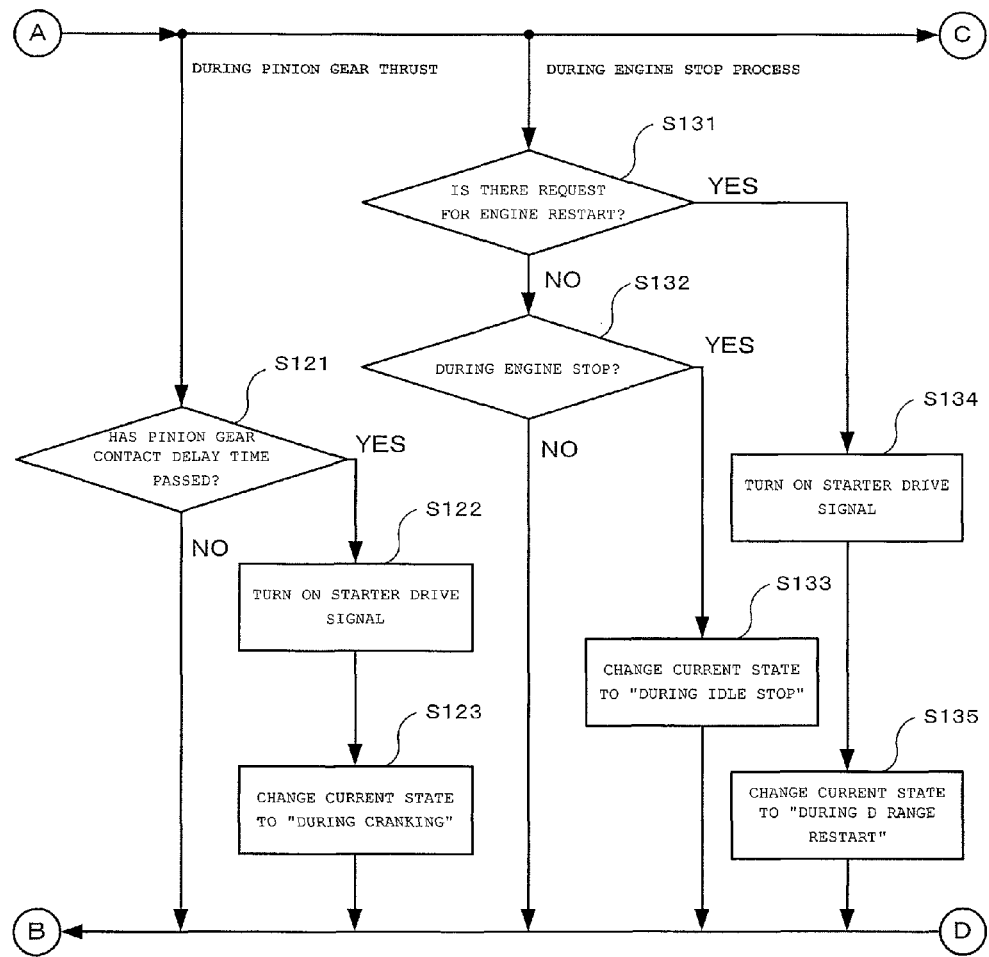
FIG. 8 is a flowchart illustrating an operation of the controller illustrated in FIG. 1.
Figure 9:
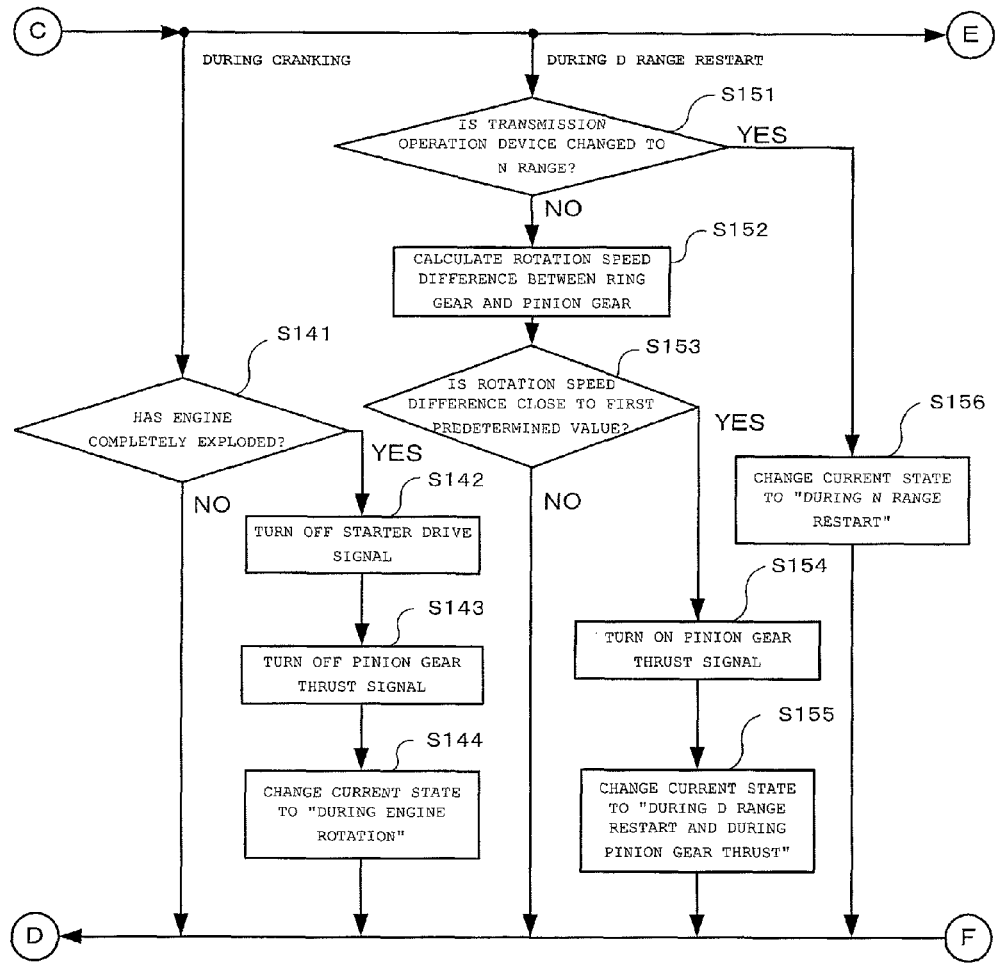
FIG. 9 is a flowchart illustrating an operation of the controller illustrated in FIG. 1.
Figure 10:
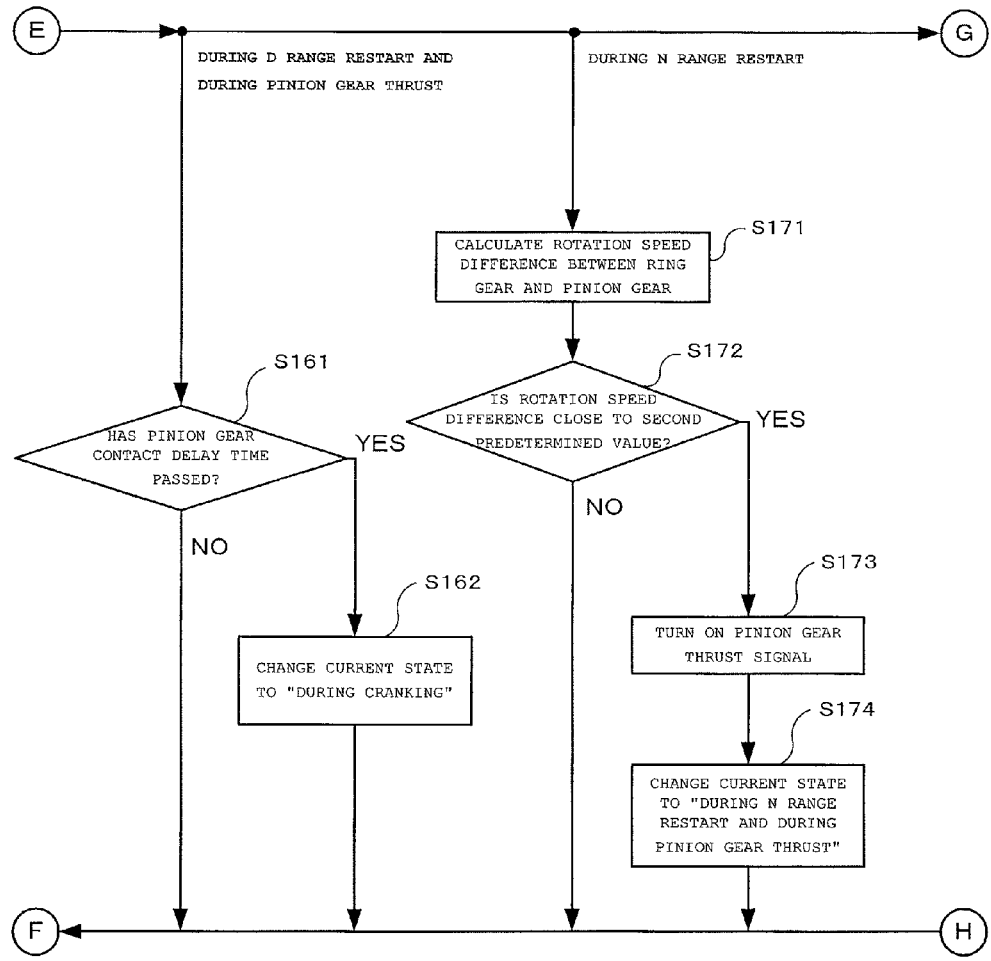
FIG. 10 is a flowchart illustrating an operation of the controller illustrated in FIG. 1.
Figure 11:
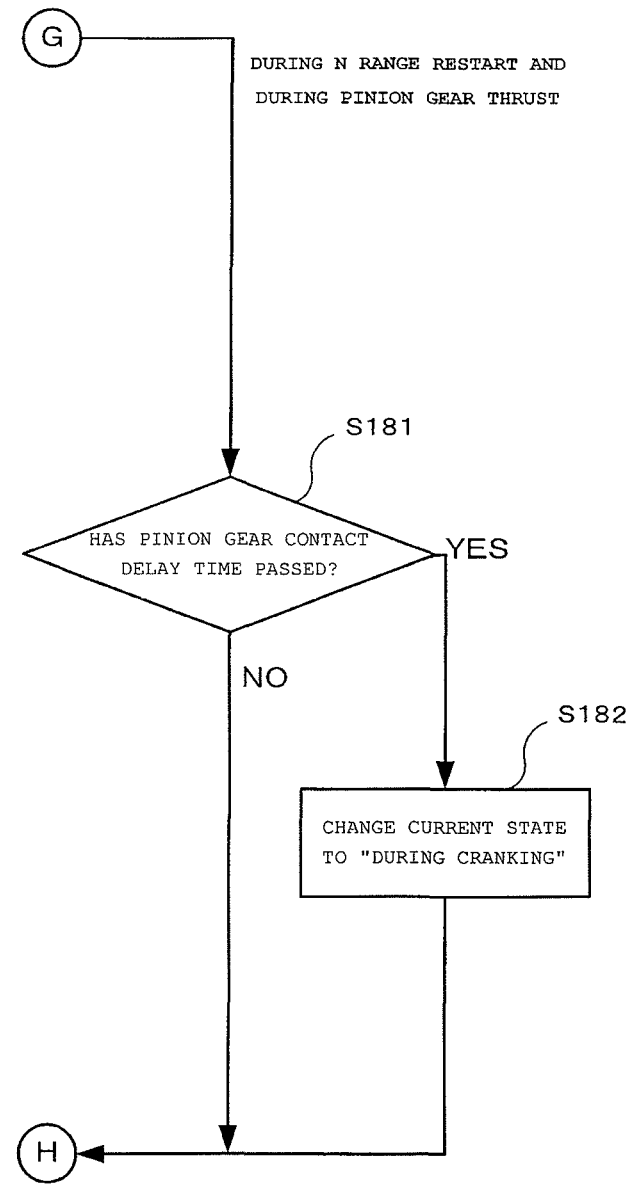
FIG. 11 is a flowchart illustrating an operation of the controller illustrated in FIG. 1.

Next, an operation of the controller 100 in the automatic engine stop and restart process according to Embodiment 1 is described. FIGS. 7 to 11 are flowcharts illustrating an operation of the controller 100 illustrated in FIG. 1. Note that the operation illustrated in FIGS. 7 to 11 is performed by the controller 100 at a constant period. In addition, FIGS. 7 and 8 are connected with each other at the nodes A and B, and FIGS. 8 and 9 are connected with each other at the nodes C and D. Further, FIGS. 9 and 10 are connected with each other at the nodes E and F, and FIGS. 10 and 11 are connected with each other at the nodes G and H.

In FIGS. 7 to 11, first, in Step S100 of FIG. 7, the controller 100 determines the current state. In this case, if the current state is "during engine rotation", the process flow of the controller 100 goes to Step S101 in FIG. 7. In addition, if the current state is "during idle stop", the process flow of the controller 100 goes to Step S111 in FIG. 7. Further, if the current state is "during pinion gear thrust", the process flow of the controller 100 goes to Step S121 in FIG. 8.

In addition, if the current state is "during engine stop process", the process flow of the controller 100 goes to Step S131 in FIG. 8. In addition, if the current state is "during cranking", the process flow of the controller 100 goes to Step S141 in FIG. 9. Further, if the current state is "during the D range restart", the process flow of the controller 100 goes to Step S151 in FIG. 9.

In addition, if the current state is "during the D range restart and during pinion gear thrust", the process flow of the controller 100 goes to Step S161 in FIG. 10. In addition, if the current state is "during the N range restart", the process flow of the controller 100 goes to Step S171 in FIG. 10. Further, if the current state is "during the N range restart and during pinion gear thrust", the process flow of the controller 100 goes to Step S181 in FIG. 11.

If the current state is "during engine rotation", the controller 100 checks whether or not there is a request for the automatic engine stop in Step S101 of FIG. 7. If there is no request for the automatic engine stop, the current task process is finished, and the process flow goes to Step S100 after a constant period of time. On the contrary, if there is a request for the automatic engine stop, the process flow of the controller 100 goes to Step S102. In Step S102, the controller 100 changes the current state to "during engine stop process", finishes the current task process, and goes to the process of Step S100 after a constant period of time.

If the current state is "during idle stop", the controller 100 checks whether or not there is not a request for the engine restart in Step S111 of FIG. 7. If there is no request for the engine restart, the current task process is finished, and the process flow goes to Step S100 after a constant period of time. On the contrary, if there is a request for the engine restart, the process flow of the controller 100 goes to Step S112. In Step S112, the controller 100 turns on the pinion gear thrust signal 100*b* and goes to the process of Step S113. In Step S113, the controller 100 changes the current state to "during pinion gear thrust" and finishes the current task process. Then, the process flow goes to Step S100 after a constant period of time.

If the current state is "during pinion gear thrust", the controller 100 checks whether or not the pinion gear abutment delay time has passed in Step S121 of FIG. 8. If the pinion gear abutment delay time has not passed, the current task process is finished, and the process flow goes to Step S100 after a constant period of time. On the contrary, if the pinion gear abutment delay time has passed, the process flow of the controller 100 goes to Step S122. In Step S122, the controller 100 turns on the starter drive signal 100*a*, and the process flow goes to Step S123. In Step S113, the controller 100 changes the current state to "during cranking", the current task process is finished, and the process flow goes to Step S100 after a constant period of time.

If the current state is "during engine stop process", the controller 100 checks whether or not there is a request for engine restart in Step S131 of FIG. 8. If there is no request for the engine restart, the process flow goes to Step S132. The controller 100 checks whether or not the engine 1 is stopped in Step S132. If the engine 1 is not stopped, the current task process is finished, and the process flow goes to Step S100 after a constant period of time.

On the contrary, if the engine 1 is stopped, the process flow of the controller 100 goes to Step S133. In Step S133, the controller 100 changes the current state to "during idle stop", finishes the current task process, and goes to the process of Step S100 after a constant period of time.

In addition, if there is a request for the engine restart in Step S131 of FIG. 8, the process flow of the controller 100 goes to Step S134. In Step S134, the controller 100 turns on the starter drive signal 100*a*, the process flow goes to Step S135. In Step S135, the controller 100 changes the current state to "during the D range restart", the current task process is finished, and the process flow goes to Step S100 after a constant period of time.

If the current state is "during cranking", the controller 100 checks whether or not complete explosion has been performed for the engine 1 (whether or not the engine 1 is in an idle state) in Step S141 of FIG. 9. If complete explosion has not been performed for the engine 1, the current task process is finished, and the process flow goes to Step S100 after a constant period of time.

On the contrary, if complete explosion has been performed for the engine 1, the controller 100 performs the process of Steps S142 and S143. In Steps S142 and S143, the controller 100 turns off the starter drive signal 100*a*, and turns off the pinion gear thrust signal 100*b*. Then, the process flow goes to Step S144. In Step S144, the controller 100 changes the current state to "during engine rotation", the current task process is finished, and the process flow goes to Step S100 after a constant period of time.

If the current state is "during D range restart", the controller 100 checks whether or not the transmission operation device 3 is changed to the N range by the driver in Step S151 of FIG. 9. If the transmission operation device 3 is not changed to the N range, the process flow goes to Step S152. In Step S152, the controller 100 calculates a rotation speed difference between the ring gear 4 and the pinion gear 5, and the process flow goes to Step S153. In Step S153, the controller 100 checks whether or not the rotation speed difference between the ring gear 4 and the pinion gear 5 is close to a first predetermined value (value determined by the first pinion gear thrust timing determination means 105). If the rotation speed difference is not close to the first predetermined value, the current task process is finished, and the process flow goes to Step S100 after a constant period of time.

On the contrary, if the rotation speed difference between the ring gear 4 and the pinion gear 5 is close to the first predetermined value, the process flow of the controller 100 goes to Step S154. In Step S154, the controller 100 turns on the pinion gear thrust signal 100*b*, and the process flow goes to Step S155. In Step S155, the controller 100 changes the current state to "during D range restart and during pinion gear thrust", the current task process is finished, and the process flow goes to Step S100 after a constant period of time.

In addition, if the transmission operation device 3 is changed to the N range in Step S151 of FIG. 9, the process flow of the controller 100 goes to Step S156. In Step S156, the controller 100 changes the current state to "during the N range restart", the current task process is finished, and the process flow goes to Step S100 after a constant period of time.

If the current state is "during the D range restart and during pinion gear thrust", the controller 100 checks whether or not the pinion gear abutment delay time has passed in Step S161 of FIG. 10. If the pinion gear abutment delay time has not passed, the controller 100 finishes the current task process, and the process flow goes to Step S100 after a constant period of time.

On the contrary, if the pinion gear abutment delay time has passed, the process flow of the controller 100 goes to Step S162. In Step S162, the controller 100 changes the current state to "during cranking", the current task process is finished, and the process flow goes to Step S100 after a constant period of time.

If the current state is "during N range restart", the controller 100 calculates a rotation speed difference between the ring gear 4 and the pinion gear 5 in Step S171 of FIG. 10, and the process flow goes to Step S172. In Step S172, the controller 100 checks whether or not the rotation speed difference between the ring gear 4 and the pinion gear 5 is close to a second predetermined value (value determined by the second pinion gear thrust timing determination means 106). If the rotation speed difference is not close to the second predetermined value, the controller 100 finishes the current task process, and the process flow goes to Step S100 after a constant period of time.

On the contrary, if the rotation speed difference between the ring gear 4 and the pinion gear 5 is close to the second predetermined value, the process flow of the controller 100 goes to Step S173. In Step S173, the controller 100 turns on the pinion gear thrust signal 100b, and the process flow goes to Step S174. In Step S174, the controller 100 changes the current state to "during N range restart and during pinion gear thrust", the current task process is finished, and the process flow goes to Step S100 after a constant period of time.

If the current state is "during the N range restart and during pinion gear thrust", the controller 100 checks whether or not the pinion gear abutment delay time has passed in Step S181 of FIG. 11. If the pinion gear abutment delay time has not passed, the current task process is finished, and the process flow goes to Step S100 after a constant period of time.

On the contrary, if the pinion gear abutment delay time has passed, the process flow of the controller 100 goes to Step S182. In Step S182, the controller 100 changes the current state to "during cranking", the current task process is finished, and the process flow goes to Step S100 after a constant period of time.

According to the automatic stop and restart device for an engine of Embodiment 1 as described above, the controller 100 controls drive of the pinion gear thrust means 12 by using two types of pinion gear thrust timings, including the pinion gear thrust timing corresponding to the speed decrease amount of the ring gear rotation speed when the transmission 2 is in the drive range and the pinion gear thrust timing corresponding to the speed decrease amount of the ring gear rotation speed when the transmission 2 is in the non-drive range. With this configuration, the pinion gear 5 does not abut against the ring gear 4 in the state where the ring gear rotation speed and the pinion gear rotation speed are not synchronized with each other. Therefore, even if the engine restart condition is satisfied during the automatic engine stop process and the transmission state is changed during the engine restart process after that, occurrence of an abnormal condition such as noise or a breakdown can be suppressed while the engine restart process is performed. In addition, the operation in accordance with the driver's intention is secured, and hence unnatural feeling to the driver can be eliminated.

Embodiment 2

In Embodiment 1, the two types of pinion gear thrust timings are used for the controller 100 to control drive of the pinion gear thrust means 12, and hence occurrence of an abnormal condition such as noise or a breakdown can be suppressed when the transmission state is changed during the engine restart process. In contrast, in Embodiment 2, the controller 100 controls the transmission state of the transmission 2 so as to suppress occurrence of an abnormal condition such as noise or a breakdown when the transmission state is changed during the engine restart process. A configuration of Embodiment 2 is the same as that of Embodiment 1, but the operation timings of the controller 100 are different between Embodiment 1 and Embodiment 2.

Figure 12:
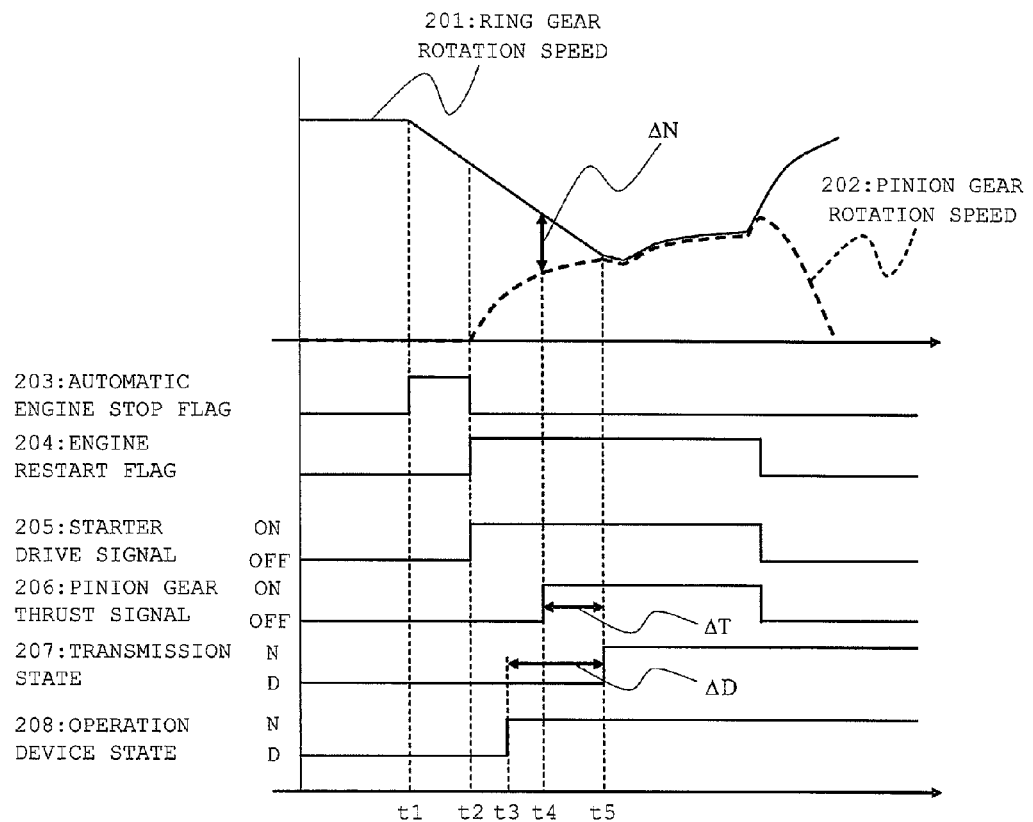
FIG. 12 is a timing chart illustrating operation timings of an automatic engine stop and restart process by a controller according to Embodiment 2 of the present invention.

Next, the operation timings of the controller 100 of Embodiment 2 are described. FIG. 12 is a timing chart illustrating the operation timings of the controller 100 in the automatic engine stop and restart process according to Embodiment 2 of the present invention. In FIG. 12, the ring gear rotation speed is represented by reference numeral 201; and the pinion gear rotation speed, 202. In addition, the automatic engine stop flag indicating that the automatic engine stop condition is satisfied is represented by reference numeral 203; and the engine restart flag indicating that the engine restart condition is satisfied, 204. Further, the starter drive signal 100a is represented by reference numeral 205; and the pinion gear thrust signal 100b, 206. In addition, the transmission state is represented by reference numeral 207; and the transmission operation device state, 208.

First, at a time point t1, the automatic engine stop condition is satisfied, and the controller 100 starts a stop process for the engine 1. After that, the engine restart condition is satisfied at a time point t2. As a result, the controller 100 turn on the starter drive signal 100a so as to start the pinion gear 5 to rotate.

At a time point t3, the driver performs the transmission operation, and hence the transmission operation device state is set to the non-drive range. In contrast, the controller 100 maintains the transmission state to be the drive range, and hence the engine restart process is continued. Then, at a time point t4, the difference ΔN between the ring gear rotation speed and the pinion gear rotation speed becomes close to a predetermined value. Therefore, the controller 100 predicts that the ring gear rotation speed and the pinion gear rotation speed are synchronized with each other after the pinion gear abutment delay time ΔT, and turns on the pinion gear thrust signal 100b.

At a time point t5, the ring gear rotation speed and the pinion gear rotation speed are synchronized with each other, and simultaneously the pinion gear 5 abuts against and engages with the ring gear 4. On this occasion, the controller 100 changes the transmission state to the non-drive range. During the period from the time point t3 to the time point t5, the controller 100 may control display means for indicating a transmission shift on an instrument panel or the like to display the non-drive range or perform blinking so as to indicate that the state is changing. After that, the controller 100 controls the pinion gear 5 to rotate so as to drive the ring gear 4. Thus, the engine 1 is cranked and is restarted.

Therefore, if the transmission operation device 3 accepts the transmission operation in the engine restart process during the automatic engine stop, the controller 100 of Embodiment 2 prioritizes the engine restart process and performs the transmission operation of the transmission 2 (changes the transmission range) after the engine 1 restarts. In other words, if the transmission operation device 3 accepts the transmission operation in the engine restart process during the automatic engine stop, the controller 100 of Embodiment 2 switches the transmission state of the transmission 2 with delay as illustrated by ΔD in FIG. 12.

Next, an operation of the controller 100 in the automatic engine stop and restart process of Embodiment 2 is described. Here, an overview of the operation of the controller 100 of Embodiment 2 is the same as that of Embodiment 1. The operation in the case where the current state is "during D range restart", the operation in the case where the current state is "during N range restart", and the operation in the case where the current state is "during N range restart and during pinion gear thrust" are different between Embodiment 1 and Embodiment 2. Here, differences between Embodiment 1 and Embodiment 2 are mainly described.

Figure 13:
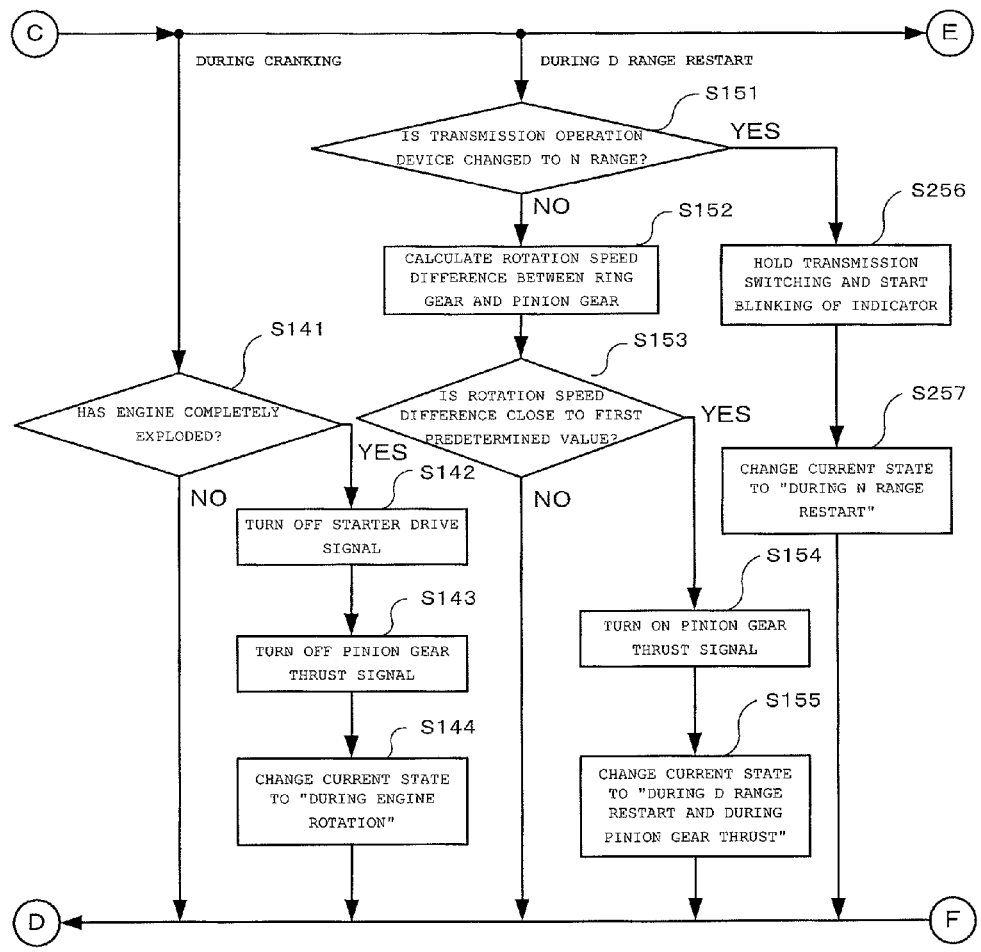
FIG. 13 is a flowchart illustrating an operation of the controller according to Embodiment 2 of the present invention.
Figure 14:
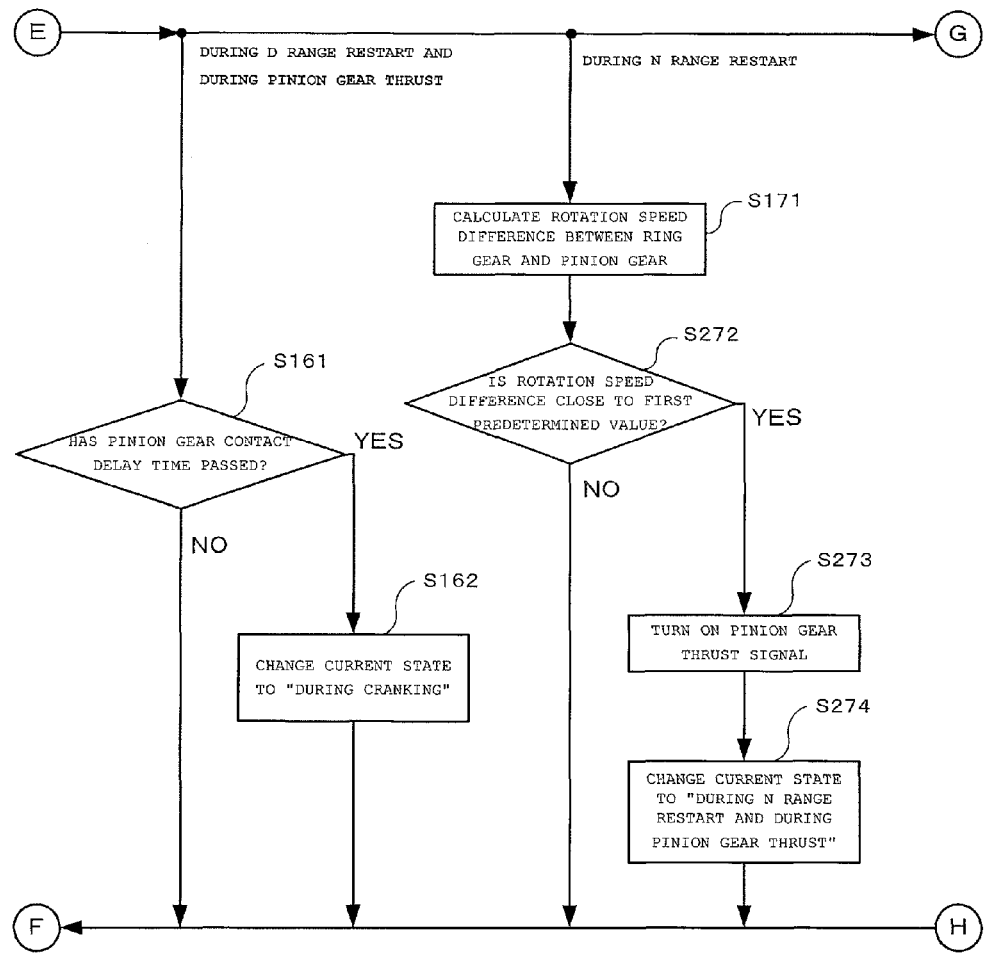
FIG. 14 is a flowchart illustrating an operation of the controller according to Embodiment 2 of the present invention.
Figure 15:
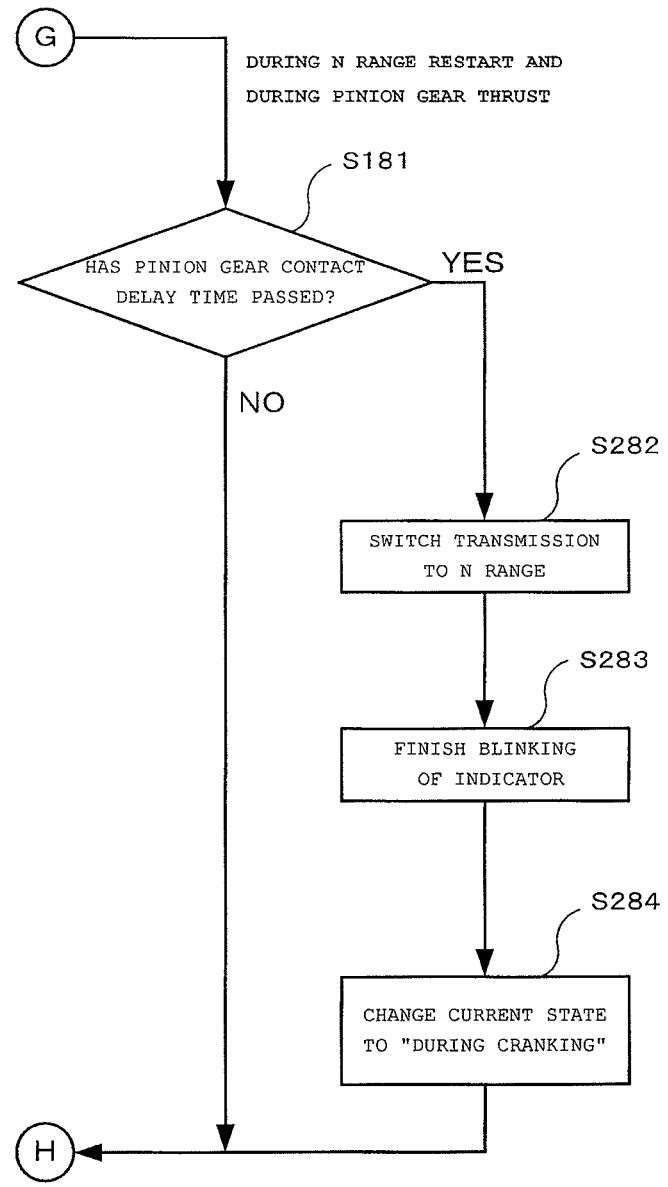
FIG. 15 is a flowchart illustrating an operation of the controller according to Embodiment 2 of the present invention.

FIGS. 13 to 15 are flowcharts illustrating the operation of the controller 100 according to Embodiment 2 of the present invention. Note that FIG. 13 is connected with FIG. 8 of Embodiment 1 at the nodes C and D. In addition, FIGS. 13 and 14 are connected with each other at the nodes E and F. Further, FIGS. 14 and 15 are connected with each other at the nodes G and H.

If the current state is "during D range restart", the controller 100 checks whether or not the driver has changed the transmission operation device 3 to the N range in Step S151 of FIG. 13. If the transmission operation device 3 is not changed to the N range, the process flow goes to Step S152. The operation in the case where the transmission operation device 3 is not changed to the N range is the same as that of Embodiment 1.

On the contrary, if the transmission operation device 3 is changed to the N range, the process flow of the controller 100 goes to Step S256. In Step S256, the controller 100 hold the range switching of the transmission 2 (maintains the transmission 2 in the D range) and starts blinking of the indicator (not shown), and the process flow goes to Step S257. In Step S257, the controller 100 changes the current state to "during N range restart", and the current task process is finished. Then, the process flow goes to Step S100 after a constant period of time.

If the current state is "during N range restart", the controller 100 calculates the rotation speed difference between the ring gear 4 and the pinion gear 5 in Step S171 of FIG. 14, and the process flow goes to Step S272. In Step S272, the controller 100 checks whether or not the rotation speed difference between the ring gear 4 and the pinion gear 5 is close to the first predetermined value (value determined by the first pinion gear thrust timing determination means 105). If the rotation speed difference is not close to the first predetermined value, the current task process is finished, and the process flow goes to Step S100 after a constant period of time.

On the contrary, if the rotation speed difference between the ring gear 4 and the pinion gear 5 is close to the first predetermined value, the process flow of the controller 100 goes to Step S273. In Step S273, the controller 100 turns on the pinion gear thrust signal 100b, and the process flow goes to Step S274. In Step S274, the controller 100 changes the current state to "during N range restart and during pinion gear thrust", and the current task process is finished. Then, the process flow goes to Step S100 after a constant period of time.

Here, in Embodiment 1, two types of predetermined values including the first predetermined value and the second predetermined value are used as illustrated in S153 of FIG. 9 or S172 in FIG. 10. In contrast, in Embodiment 2, the transmission state is not changed until the controller 100 completes the restart process even if the transmission operation is performed in the engine restart process during the automatic engine stop. Thus, even if the transmission operation device 3 accepts the transmission operation, the controller 100 maintains the transmission 2 in the D range, and hence the decrease ratio of the rotation of the ring gear 4 is not changed. Therefore, only one type of predetermined value, that is, the first predetermined value can be used.

If the current state is "during the N range restart and during pinion gear thrust", the controller 100 checks whether or not the pinion gear abutment delay time has passed in Step S181 of FIG. 15. If the pinion gear abutment delay time has not passed, the current task process is finished, and the process flow goes to Step S100 after a constant period of time. On the contrary, if the pinion gear abutment delay time has passed, the process flow of the controller 100 goes to Step S282.

In Step S282, the controller 100 switches the transmission 2 to the N range, and the process flow goes to Step S283. In Step S283, the controller 100 stops blinking of the indicator, and the process flow goes to Step S284. In Step S284, the controller 100 changes the current state to "during cranking", and the current task process is finished. Then, the process flow goes to Step S100 after a constant period of time. Other operations are the same as those of Embodiment 1.

According to the automatic stop and restart device for an engine of Embodiment 2 as described above, even if the transmission operation is performed in the engine restart process during the automatic engine stop, the transmission state is not changed until the controller 100 finishes the restart process. With this configuration, no change occurs in the decrease amount of the engine rotation speed due to transmission operation. Therefore, a difference of synchronizing timing between the pinion gear rotation speed and the ring gear rotation speed does not occur so that the pinion gear 5 and the ring gear 4 can engage with each other. As a result, occurrence of an abnormal condition such as noise or a breakdown can be suppressed when the engine restart process is performed.

In addition, compared with the case where the transmission 2 is in the N range, the influence of a load of the generator or the like is small with little variation, and hence the engine 1 can be restarted more securely.

Embodiment 3

In Embodiment 1, the two types of pinion gear thrust timings are used for the controller 100 to control drive of the pinion gear thrust means 12, and hence occurrence of an abnormal condition such as noise or a breakdown can be suppressed when the transmission state is changed during the engine restart process. In contrast, in Embodiment 3, in a case where the pinion gear 5 and the ring gear 4 cannot engage with each other, the controller 100 stops the engine restart process so as to suppress occurrence of an abnormal condition such as noise or a breakdown when the transmission state is changed during the engine restart process. A configuration of Embodiment 3 is the same as that of Embodiment 1, but the operation timings of the controller 100 are different between Embodiment 1 and Embodiment 3.

Figure 16:
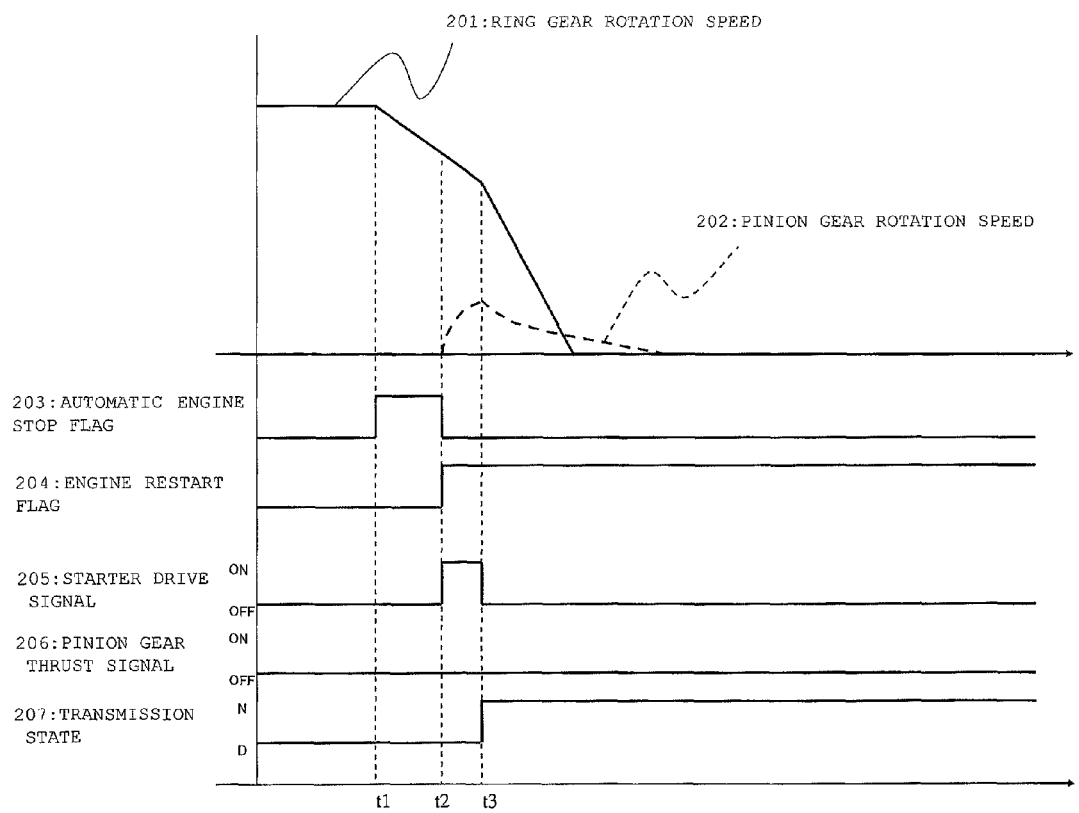
FIG. 16 is a timing chart illustrating operation timings of an automatic engine stop and restart process by a controller according to Embodiment 3 of the present invention.

Next, the operation timings of the controller 100 of Embodiment 3 are described. FIG. 16 is a timing chart illustrating the operation timings of the controller 100 in the automatic engine stop and restart process according to Embodiment 3 of the present invention. In FIG. 16, the ring gear rotation speed is represented by reference numeral 201; and the pinion gear rotation speed, 202. In addition, the automatic engine stop flag indicating that the automatic engine stop condition is satisfied is represented by reference numeral 203; and the engine restart flag indicating that the engine restart condition, 204. Further, the starter drive signal 100a is represented by reference numeral 205; and the pinion gear thrust signal 100b, 206. In addition, the transmission state is represented by reference numeral 207.

First, at a time point t1, the automatic engine stop condition is satisfied, and the controller 100 starts a stop process for the engine 1. After that, the engine restart condition is satisfied at a time point t2. As a result, the controller 100 turn on the starter drive signal 100a so as to start the pinion gear 5 to rotate.

At a time point t3, the transmission state is changed to the non-drive range. At the same time, the controller 100 turns off the starter drive signal 100a (stops the signal output). Note that if the pinion gear thrust signal 100b is ON, the controller 100 turns off the starter drive signal 100a and also turns off the pinion gear thrust signal 100b. Therefore, the controller 100 of Embodiment 3 stops the engine restart process.

Next, an operation of the automatic engine stop and restart process of the controller 100 of Embodiment 3 is described. Here, an overview of the operation of the controller 100 of Embodiment 3 is the same as that of Embodiment 1. The operation in the case where the current state is "during D range restart" and the operation in the case where the current state is "during D range restart and during pinion gear thrust" are different between Embodiment 1 and Embodiment 3. In addition, in Embodiment 3, the operation in the case of "during N range restart" and the operation in the case of "during N range restart and during pinion gear thrust" in Embodiment 1 are omitted unlike Embodiment 1. Here, the difference between Embodiment 1 and Embodiment 3 is described mainly.

Figure 17:
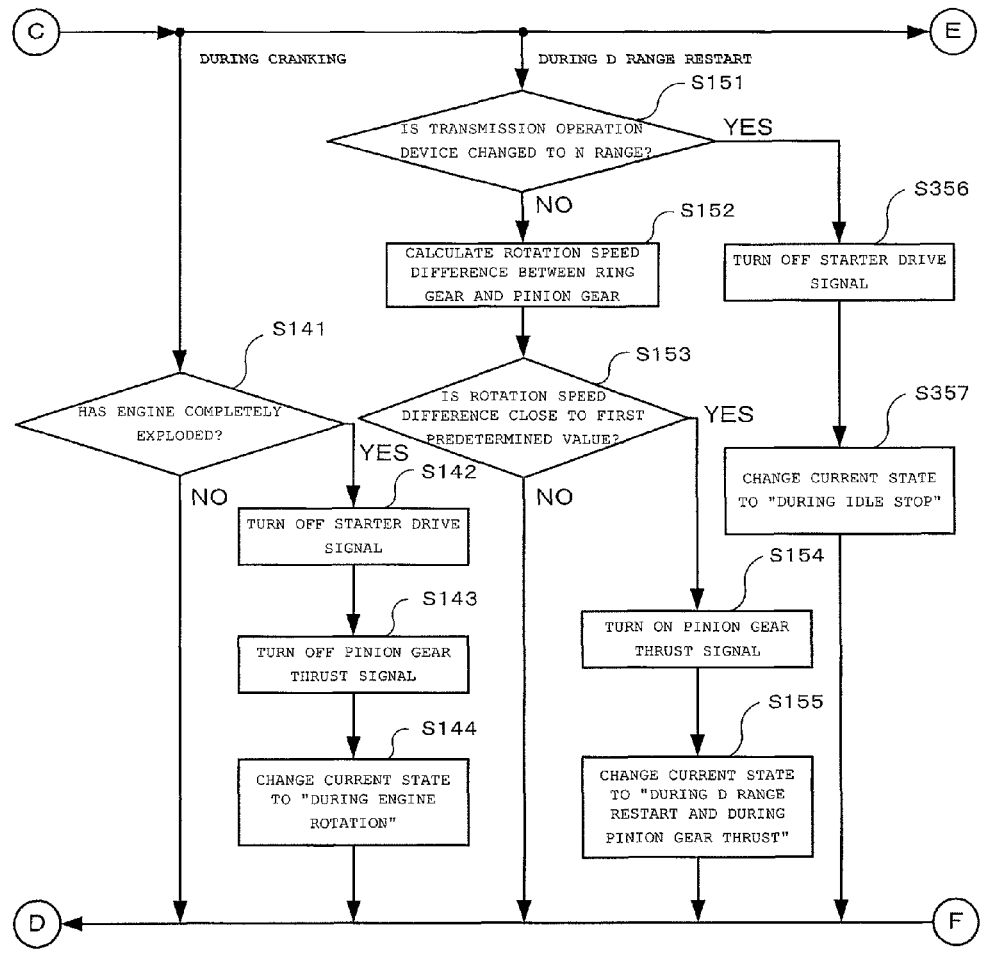
FIG. 17 is a flowchart illustrating an operation of the controller according to Embodiment 3 of the present invention.
Figure 18:
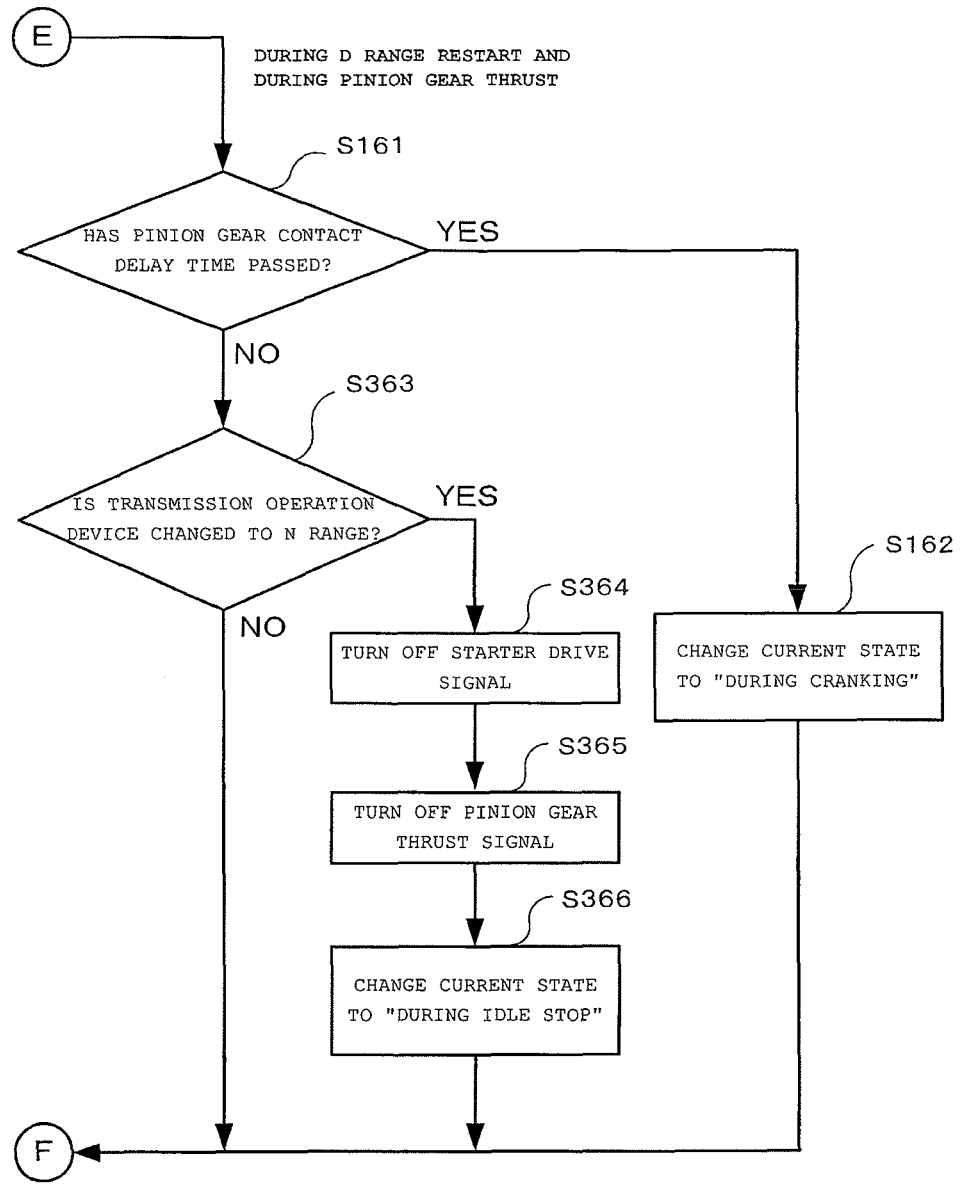
FIG. 18 is a flowchart illustrating an operation of the controller according to Embodiment 3 of the present invention.

FIGS. 17 and 18 are flowcharts illustrating the operation of the controller 100 according to Embodiment 3 of the present invention. Note that FIG. 17 is connected with FIG. 8 of Embodiment 1 at the nodes C and D. In addition, FIGS. 17 and 18 are connected with each other at the nodes E and F.

If the current state is "during D range restart", the controller 100 checks whether or not the driver has changed the transmission operation device 3 to the N range in Step S151 of FIG. 17. If the transmission operation device 3 is not changed to the N range, the process flow goes to Step S152. The operation in the case where the transmission operation device 3 is not changed to the N range is the same as that of Embodiment 1.

On the contrary, if the transmission operation device 3 is changed to the N range, the process flow of the controller 100 goes to Step S356. In Step S356, the controller 100 turns off the starter drive signal 100a, and the process flow goes to Step S357. In Step S357, the controller 100 changes the current state to "during idle stop", and the current task process is finished. Then, the process flow goes to Step S100 after a constant period of time.

If the current state is "during D range restart and during pinion gear thrust", the controller 100 checks whether or not the pinion gear abutment delay time has passed in Step S161 of FIG. 18. If the pinion gear abutment delay time has passed, the process flow goes to Step S162. In Step S162, the controller 100 changes the current state to "during cranking", and the current task process is finished. Then, the process flow goes to Step S100 after a constant period of time.

On the contrary, if the pinion gear abutment delay time has not passed, the process flow of the controller 100 goes to Step S363. In Step S363, the controller 100 checks whether or not the driver has changed the transmission operation device 3 to the N range. If the transmission operation device 3 is not changed to the N range, the current task process is finished. Then, the process flow goes to Step S100 after a constant period of time.

In Step S363, if the transmission operation device 3 is changed to the N range, the process flow of the controller 100 goes to Steps S364 and S365. In Steps S364 and S365, the controller 100 turns off the starter drive signal 100a and turns off the pinion gear thrust signal 100b. Then, the process flow goes to Step S366. In Step S366, the controller 100 changes the current state to "during idle stop", and the current task process is finished. Then, the process flow goes to Step S100 after a constant period of time. Other operations are the same as those of Embodiment 1.

According to the automatic stop and restart device for an engine of Embodiment 3 as described above, the controller 100 stops the engine restart process in the state where the pinion gear 5 and the ring gear 4 cannot engage with each other when the transmission operation is performed in the engine restart process during the automatic engine stop. Thus, occurrence of an abnormal condition such as noise or a breakdown can be prevented more securely.

Embodiment 4

In Embodiment 3, if the pinion gear 5 and the ring gear 4 cannot engage with each other, the controller 100 stops the engine restart process. In contrast, in Embodiment 4, if the pinion gear 5 and the ring gear 4 cannot engage with each other, the controller 100 stops the engine restart process and after the stopping, performs the engine restart process again. An overview of the configuration of Embodiment 4 is the same as that of Embodiment 1, but operation timings of the controller 100 of Embodiment 4 are different from those of Embodiments 1 and 3.

Figure 19:
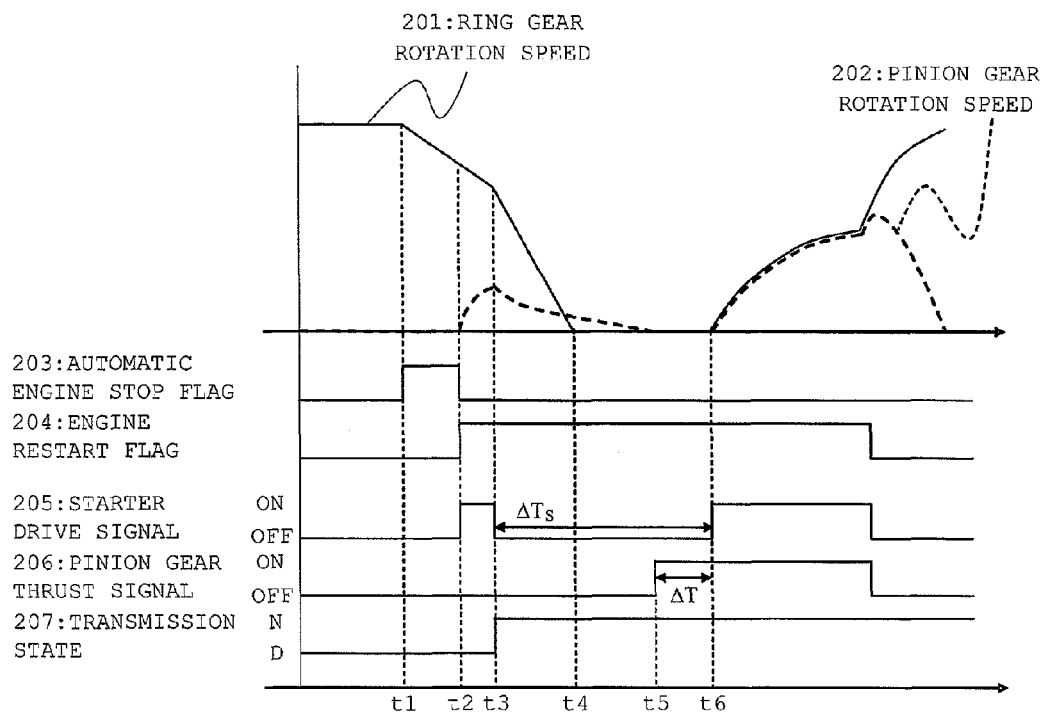
FIG. 19 is a timing chart illustrating operation timings of an automatic engine stop and restart process by a controller according to Embodiment 4 of the present invention.

Next, the operation timings of the controller 100 of Embodiment 4 are described. FIG. 19 is a timing chart illustrating the operation timings of the controller 100 in the automatic engine stop and restart process according to Embodiment 4 of the present invention. In FIG. 19, the ring gear rotation speed is represented by reference numeral 201; and the pinion gear rotation speed, 202. In addition, the automatic engine stop flag indicating that the automatic engine stop condition is satisfied is represented by reference numeral 203; and the engine restart flag indicating that the engine restart condition is satisfied, 204. Further, the starter drive signal 100a is represented by reference numeral 205; and the pinion gear thrust signal 100b, 206. In addition, the transmission state is represented by reference numeral 207.

First, at a time point t1, the automatic engine stop condition is satisfied, and the controller 100 starts a stop process for the engine 1. After that, the engine restart condition is satisfied at a time point t2. As a result, the controller 100 turn on the starter drive signal 100a so as to start the pinion gear 5 to rotate.

At a time point t3, the transmission state is changed to the non-drive range. At the same time, the controller 100 turns off the starter drive signal 100a (stops the signal output). Note that if the pinion gear thrust signal 100b is ON, the controller 100 turns off the starter drive signal 100a and also turns off the pinion gear thrust signal 100b.

At a time point t4, rotation of the engine 1 is stopped. Then, at a time point t5, the controller 100 turns on the pinion gear thrust signal 100b. This operation of the controller 100 turning on the pinion gear thrust signal 100b at the time point t5 is performed because time $\Delta T_S$ that is predicted to be necessary for stopping rotation of the pinion gear passes from the time point t3 as a starter drive stop time point to a time point t6 when the pinion gear thrust delay time $\Delta T$ has passed from the time point t5. Note that time calculated by subtracting the pinion gear thrust delay time $\Delta T$ from the time $\Delta T_S$ is a restart inhibit time.

At the time point t6, the pinion gear 5 abuts against the ring gear 4, and the controller 100 turns on the starter drive signal 100a. Then, the pinion gear 5 is caused to engage with the ring gear 4 so as to drive the ring gear 4. Thus, the engine 1 is cranked and is restarted. Therefore, the controller 100 of Embodiment 4 stops the engine restart process and after the stopping, performs the engine restart process again.

Next, an operation of the controller 100 in the automatic engine stop and restart process of Embodiment 4 is described.

Here, an overview of the operation of the controller 100 of Embodiment 4 is the same as that of Embodiment 1. The operation in the case where the current state is "during D range restart" and the operation in the case where the current state is "during D range restart and during pinion gear thrust" are different between Embodiment 1 and Embodiment 4. In addition, Embodiment 4 is different from Embodiment 1 also in that the operation of "during gear rotation stop and wait" and the operation of "during gear rotation stop and wait and during pinion gear thrust" are performed instead of the operation in the case of "during N range restart" and the operation in the case of "during N range restart and during pinion gear thrust" in Embodiment 1. Here, the difference from Embodiment 1 is described mainly.

Figure 20:
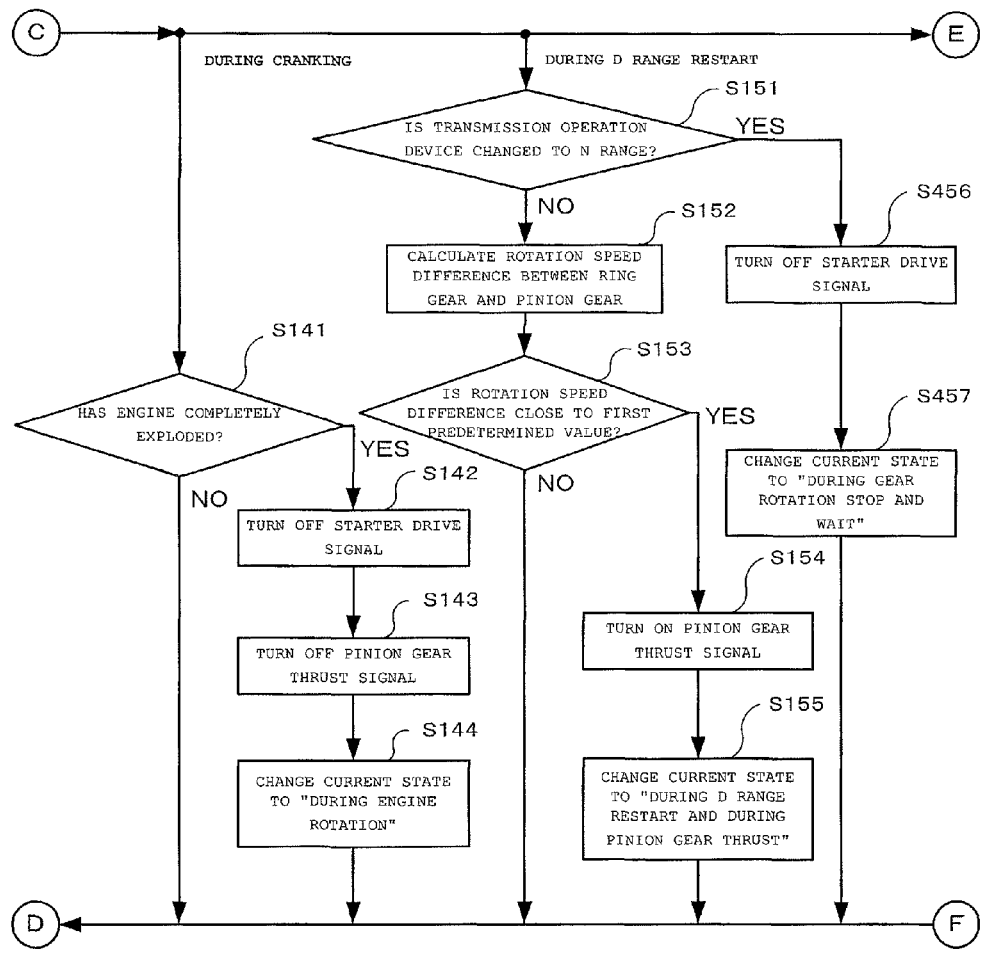
FIG. 20 is a flowchart illustrating an operation of the controller according to Embodiment 4 of the present invention.
Figure 21:
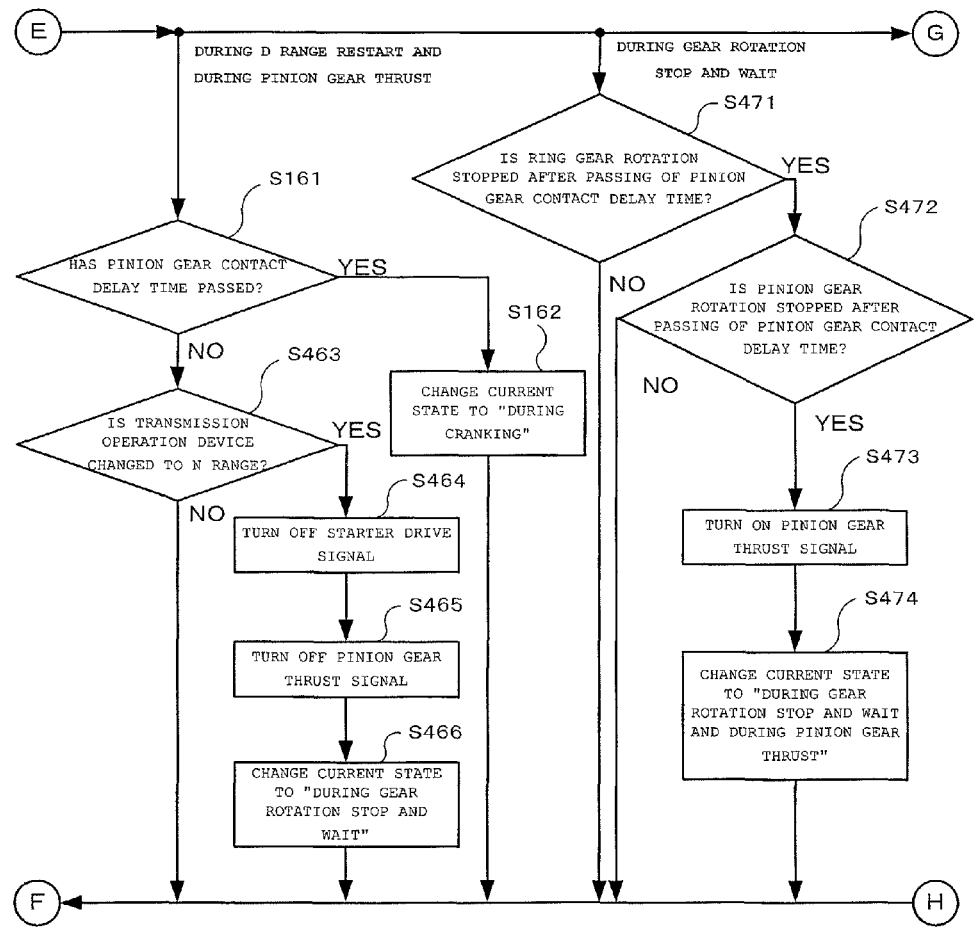
FIG. 21 is a flowchart illustrating an operation of the controller according to Embodiment 4 of the present invention.
Figure 22:
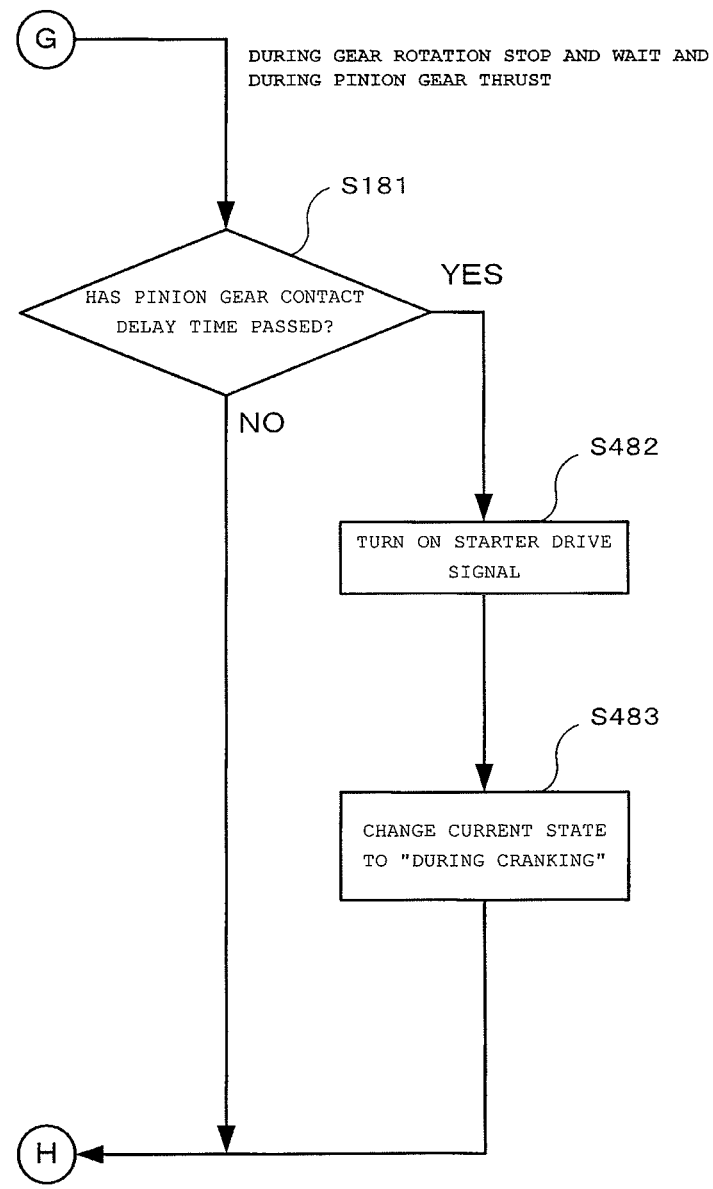
FIG. 22 is a flowchart illustrating an operation of the controller according to Embodiment 4 of the present invention.

FIGS. 20 to 22 are flowcharts illustrating the operation of the controller 100 according to Embodiment 4 of the present invention. Note that FIG. 20 is connected with FIG. 8 of Embodiment 1 at the nodes C and D. In addition, FIGS. 20 and 21 are connected with each other at the nodes E and F. Further, FIGS. 21 and 22 are connected with each other at the nodes G and H.

If the current state is "during D range restart", the controller 100 checks whether or not the driver has changed the transmission operation device 3 to the N range in Step S151 of FIG. 20. If the transmission operation device 3 is not changed to the N range, the process flow goes to Step S152. The operation in the case where the transmission operation device 3 is not changed to the N range is the same as that of Embodiment 1.

On the contrary, if the transmission operation device 3 is changed to the N range, the process flow of the controller 100 goes to Step S456. In Step S456, the controller 100 turns off the starter drive signal 100a, and the process flow goes to Step S457. In Step S457, the controller 100 changes the current state to "during gear rotation stop and wait", and the current task process is finished. Then, the process flow goes to Step S100 after a constant period of time.

If the current state is "during D range restart and during pinion gear thrust", the controller 100 checks whether or not the pinion gear abutment delay time has passed in Step S161 of FIG. 21. If the pinion gear abutment delay time has passed, the process flow goes to Step S162. In Step S162, the controller 100 changes the current state to "during cranking", and the current task process is finished. Then, the process flow goes to Step S100 after a constant period of time.

On the contrary, if the pinion gear abutment delay time has not passed, the process flow of the controller 100 goes to Step S463. In Step S463, the controller 100 checks whether or not the driver has changed the transmission operation device 3 to the N range. If the transmission operation device 3 is not changed to the N range, the current task process is finished. Then, the process flow goes to Step S100 after a constant period of time.

In Step S463, if the transmission operation device 3 is changed to the N range, the process flow of the controller 100 goes to Steps S464 and S465. In Steps S464 and S465, the controller 100 turns off the starter drive signal 100a and turns off the pinion gear thrust signal 100b. Then, the process flow goes to Step S466. In Step S466, the controller 100 changes the current state to "during gear rotation stop and wait", and the current task process is finished. Then, the process flow goes to Step S100 after a constant period of time.

If the current state is "during gear rotation stop and wait", the controller 100 checks in Step S471 of FIG. 21 whether or not it is predicted that the rotation of the ring gear 4 is stopped after passing of the pinion gear abutment delay time. If it is predicted that the rotation of the ring gear 4 is not stopped, the current task process is finished, and the process flow goes to Step S100 after a constant period of time. On the contrary, if it is predicted that the rotation of the ring gear 4 is stopped, the process flow of the controller 100 goes to Step S472.

In Step S472, if a constant time (e.g., 1,500 msec) has not passed from a starter motor drive stop time point after passing of the pinion gear abutment delay time (that is, if it is predicted that the rotation of the pinion gear 5 is not stopped), the controller 100 finishes the current task process. Then, the process flow goes to Step S100 after a constant period of time.

On the contrary, if the constant time has passed from the starter motor drive stop time point after passing of the pinion gear abutment delay time (that is, if it is predicted that the rotation of the pinion gear 5 is stopped), the process flow of the controller 100 goes to Step S473. In Step S473, the controller 100 turns on the pinion gear thrust signal 100b, and the process flow goes to Step S474. In Step S474, the controller 100 changes the current state to "during gear rotation stop and wait and during pinion gear thrust", and the current task process is finished. Then, the process flow goes to Step S100 after a constant period of time.

If the current state is "during gear rotation stop and wait and during pinion gear thrust", the controller 100 checks whether or not the pinion gear abutment delay time has passed in Step S181 of FIG. 22. If the pinion gear abutment delay time has not passed, the current task process is finished, and the process flow goes to Step S100 after a constant period of time. On the contrary, if the pinion gear abutment delay time has passed, the process flow of the controller 100 goes to Step S482.

In Step S482, the controller 100 turns on the starter drive signal 100a, and the process flow goes to Step S483. In Step S483, the controller 100 changes the current state to "during cranking", the current task process is finished, and the process flow goes to Step S100 after a constant period of time. Other operations are the same as those of Embodiment 1.

According to the automatic stop and restart device for an engine of Embodiment 4 as described above, if the pinion gear 5 and the ring gear 4 cannot engage with each other when the transmission operation is performed in the engine restart process during the automatic engine stop, the controller 100 restarts the engine 1 after the rotations of the pinion gear 5 and the ring gear 4 are stopped. With this configuration, occurrence of noise or a breakdown due to a failure in the synchronization between the pinion gear rotation speed and the ring gear rotation speed can be prevented while the engine 1 can be restarted without a complicated operation.

Embodiment 5

In Embodiment 5, when the engine restart process is stopped, a gear rotation stop time point when both the rotation speed of the pinion gear 5 and the rotation speed of the ring gear 4 become zero is predicted, and the engine restart process is performed again after the predicted gear rotation stop time point.

An overview of the configuration of the controller 100 of Embodiment 5 is similar to that of Embodiment 1. However, the controller 100 of Embodiment 5 further includes starter motor drive stop time measurement means, starter motor stop pinion gear rotation speed estimation means, and gear rotation stop time point prediction means (each of them is not shown).

Figure 23:
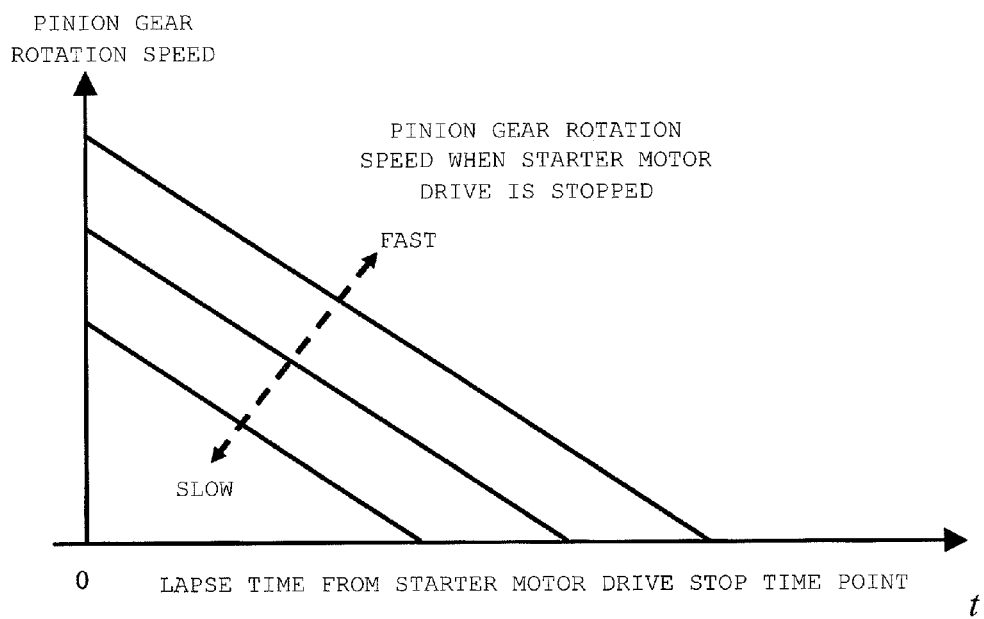
FIG. 23 is a graph illustrating a map for estimating a pinion gear rotation speed.
Figure 24:
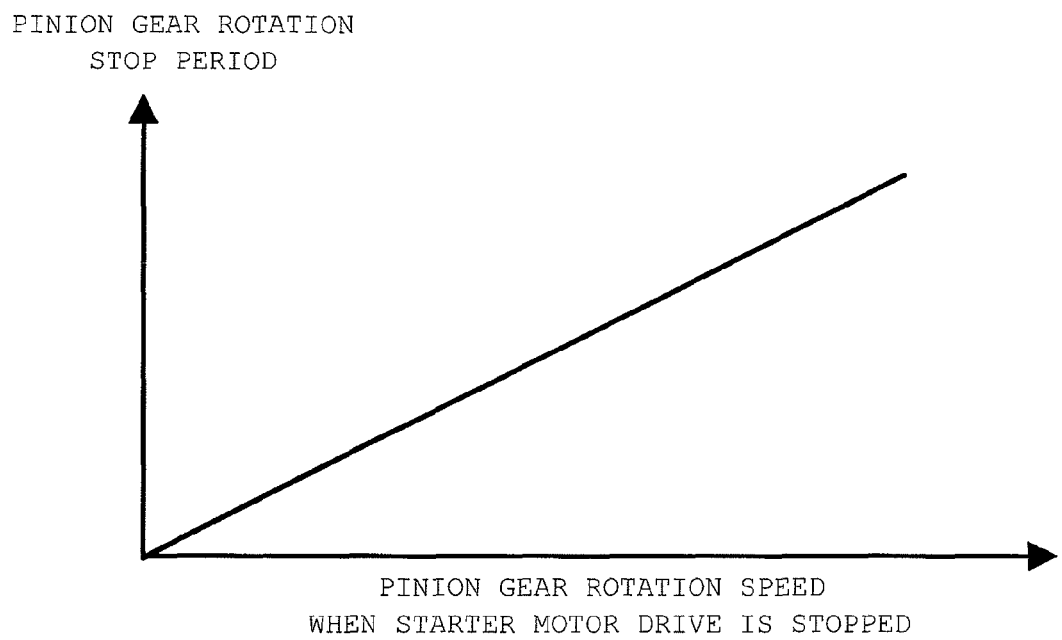
FIG. 24 is a graph illustrating a map for predicting a gear rotation stop time point.

The starter motor drive stop time measurement means measures time from the drive stop time point of the starter motor 11. The starter motor stop pinion gear rotation speed estimation means estimates a pinion gear rotation speed after the drive stop of the starter motor 11 (decrease pattern of the rotation speed) based on the pinion gear rotation speed at the drive stop time point of the starter motor 11 and the starter motor drive stop time measured by the starter motor drive stop time measurement means. The gear rotation stop time point prediction means predicts a gear rotation stop time point when both the rotation speed of the pinion gear 5 and the rotation speed of the ring gear 4 become zero by using maps as illustrated in FIGS. 23 and 24.

Figure 25:
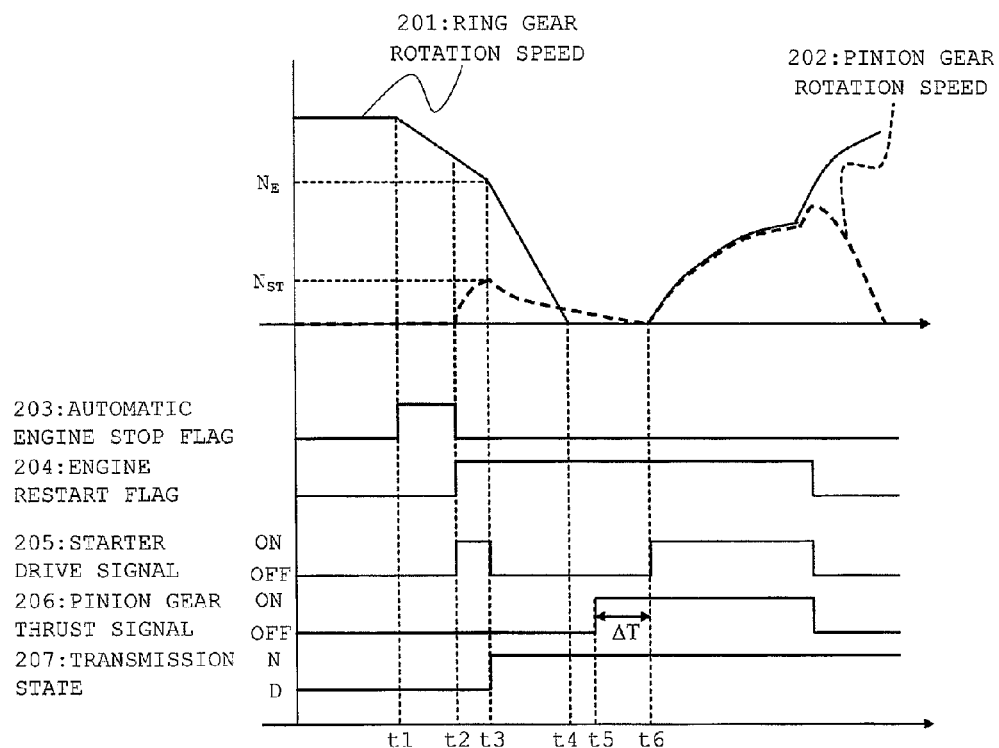
FIG. 25 is a timing chart illustrating operation timings of an automatic engine stop and restart process by a controller according to Embodiment 5 of the present invention.

Next, operation timings of the controller 100 of Embodiment 5 are described. FIG. 25 is a timing chart illustrating operation timings of the controller 100 in the automatic engine stop and restart process according to Embodiment 5 of the present invention. Similarly to FIG. 19, individual elements are represented by reference numerals 201 to 207 in FIG. 25. In addition, operation timings until a time point t3 in this example are the same as operation timings in the case illustrated in FIG. 19. Here, operation timings after a time point t4 are described mainly.

At the time point t4, the rotation of the engine 1 is stopped. The controller 100 predicts that rotations of the engine 1 and the pinion gear 5 are both stopped at a time point t6 when the pinion gear abutment delay time ΔT passes after a time point t5, and turns on the pinion gear thrust signal 100b at the time point t5. At the time point t6, the ring gear rotation and the pinion gear rotation are both stopped, and the pinion gear 5 abuts against the ring gear 4. In other words, the time point t6 is the gear rotation stop time point.

After the time point t6, the controller 100 turns on the starter drive signal 100a, and hence the pinion gear 5 engages with the ring gear 4. Then, the controller 100 drives the ring gear 4, and hence the engine 1 is cranked and is restarted. Note that it can be predicted that the temporal relationship between the time point t4 when the rotation of the engine 1 is stopped and the time point t6 when the rotation of the pinion gear 5 is stopped is changed oppositely.

Therefore, the controller 100 of Embodiment 5 stops the restart process during the restart inhibit time from the drive stop time point of the starter motor 11 to the gear rotation stop time point, and performs the engine restart process again after the restart inhibit time passes.

Next, an operation of the controller 100 in the automatic engine stop and restart process according to Embodiment 5 is described. An overview of the operation of the controller 100 of Embodiment 5 is similar to that of Embodiment 4. Here, only a difference between Embodiment 4 and Embodiment 5 is described. When the controller 100 of Embodiment 5 performs the process of Step S472 of FIG. 21 described in Embodiment 4, the controller 100 uses the map as illustrated in FIG. 23 for estimating the pinion gear rotation speed based on the pinion gear rotation speed when the starter motor drive is stopped and the time after the starter motor drive is stopped. Then, the controller 100 predicts whether or not the rotation of the pinion gear 5 is stopped after the pinion gear abutment delay time. Other operations are the same as those of Embodiment 4.

According to the automatic stop and restart device for an engine of Embodiment 5 as described above, the controller 100 estimates the pinion gear rotation speed from the drive stop time point of the starter motor 11, and hence the timing when the rotation of the pinion gear 5 is stopped can be estimated appropriately. Thus, time necessary for restarting the engine 1 can be shortened. In other words, in the case where the engine restart process is stopped and the engine restart process is retried thereafter, waiting time can be shortened so that the engine 1 can be restarted more promptly.

Embodiment 6

In Embodiment 5, the controller 100 estimates the timing when the rotation of the pinion gear 5 is stopped and performs the engine restart process in synchronization with the stop timing. In contrast, in Embodiment 6, if it is predicted that the pinion gear rotation speed and the ring gear rotation speed are synchronized with each other in the period in which the pinion gear rotation speed and the ring gear rotation speed are decreasing, the controller 100 performs the engine restart process without waiting for the rotation stop of the pinion gear 5 and the ring gear 4. An overview of the configuration of Embodiment 6 is similar to that of Embodiment 5, but operation timings of the controller 100 are different from those of Embodiment 5.

Figure 26:
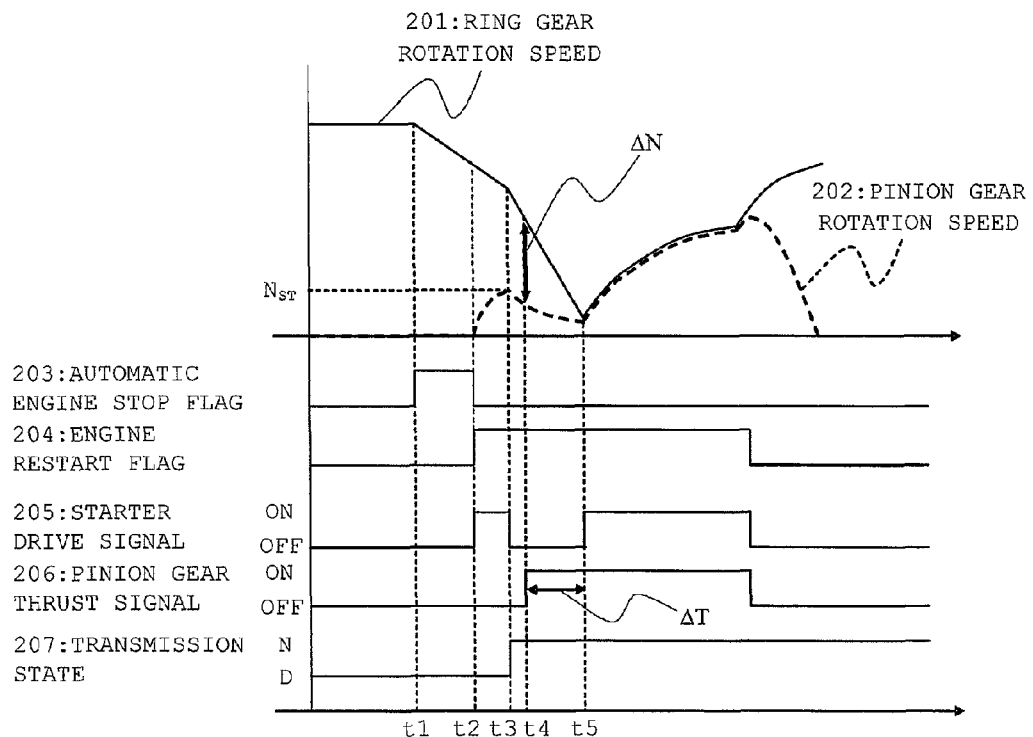
FIG. 26 is a timing chart illustrating operation timings of an automatic engine stop and restart process by a controller according to Embodiment 6 of the present invention.

Next, the operation timings of the controller 100 of Embodiment 6 are described. FIG. 26 is a timing chart illustrating the operation timings of the controller 100 in the automatic engine stop and restart process according to Embodiment 6 of the present invention. Reference numerals 201 to 207 of FIG. 26 are the same as those of FIG. 19.

At a time point t1, the automatic engine stop condition is satisfied, and the controller 100 starts a stop process for the engine 1. After that, the engine restart condition is satisfied at a time point t2. As a result, the controller 100 turn on the starter drive signal 100a so as to start the pinion gear 5 to rotate.

At a time point t3, the transmission state is changed to the non-drive range. At the same time, the controller 100 turns off the starter drive signal 100a. Note that the controller 100 also turns off the pinion gear thrust signal 100b if the pinion gear thrust signal 100b is ON. After that, the controller 100 estimates the pinion gear rotation speed based on a pinion gear rotation speed $N_{ST}$ at the time point t3 and the lapse time from the drive stop time point of the starter motor 11.

At a time point t4, the difference ΔN between the ring gear rotation speed and the pinion gear rotation speed becomes close to a predetermined value. Therefore, the controller 100 predicts that the ring gear rotation speed and the pinion gear rotation speed are synchronized with each other after the pinion gear abutment delay time ΔT, and turns on the pinion gear thrust signal 100b at the time point t4. Here, the predetermined value used for ΔN can be defined by using a map (not shown) to be referred to based on the ring gear rotation speed and the pinion gear rotation speed.

At a time point t5, the ring gear rotation speed and the pinion gear rotation speed are synchronized with each other. At the same time, the pinion gear 5 abuts against the ring gear 4 so that the pinion gear 5 and the ring gear 4 engage with each other. After the time point t5, the controller 100 turns on the starter drive signal 100a and drives the pinion gear 5 to rotate, to thereby drive the ring gear 4. Thus, the engine 1 is cranked, that is, is restarted.

Next, an operation of the controller 100 in the automatic engine stop and restart process of Embodiment 6 is described. An overview of the operation of the controller 100 of Embodiment 6 is the same as that of Embodiment 1. The operation in the case where the current state is "during D range restart" and the operation in the case where the current state is "during D range restart and during pinion gear thrust" are different between Embodiment 1 and Embodiment 6. In addition, Embodiment 6 is different from Embodiment 1 also in that the operation of "during gear rotation stop and wait", the operation of "during gear rotation stop and wait and during pinion gear thrust", and an operation of "during decrease in rotation speed and during restart pinion gear thrust" are performed instead of the operation in the case of "during N range restart" and the operation in the case of "during N range restart and during pinion gear thrust" in Embodiment 1. Here, the difference from Embodiment 1 is described mainly.

Figure 27:
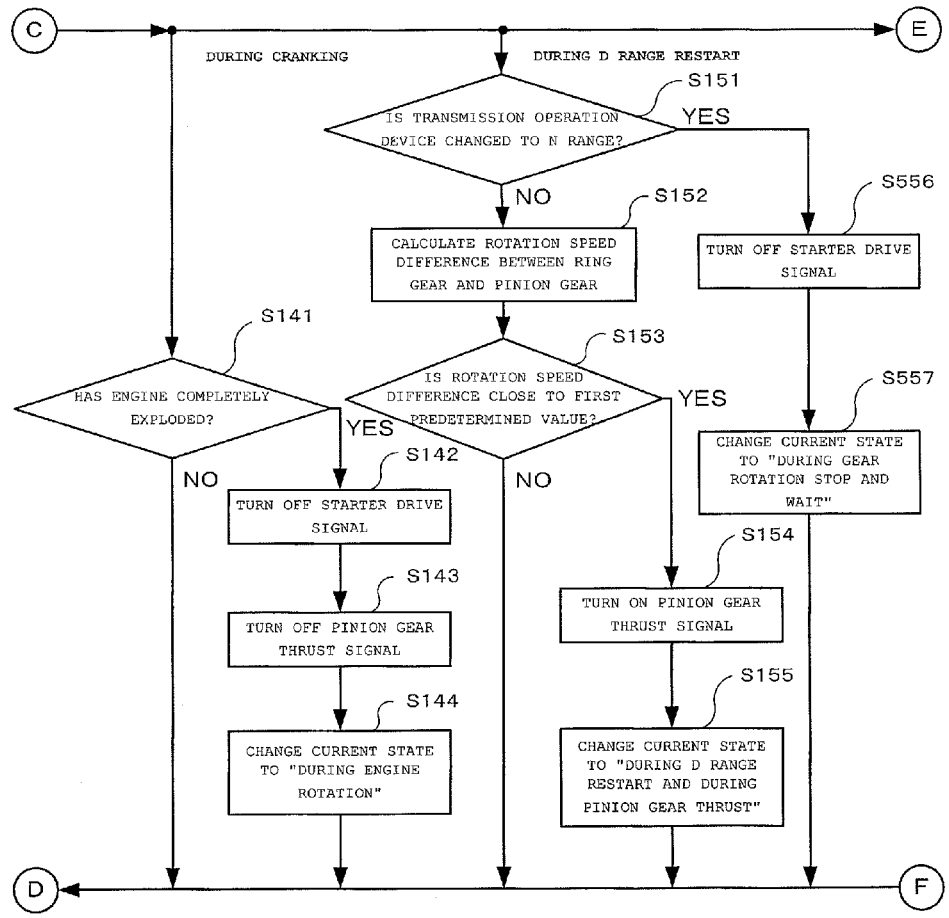
FIG. 27 is a flowchart illustrating an operation of the controller according to Embodiment 6 of the present invention.
Figure 28:
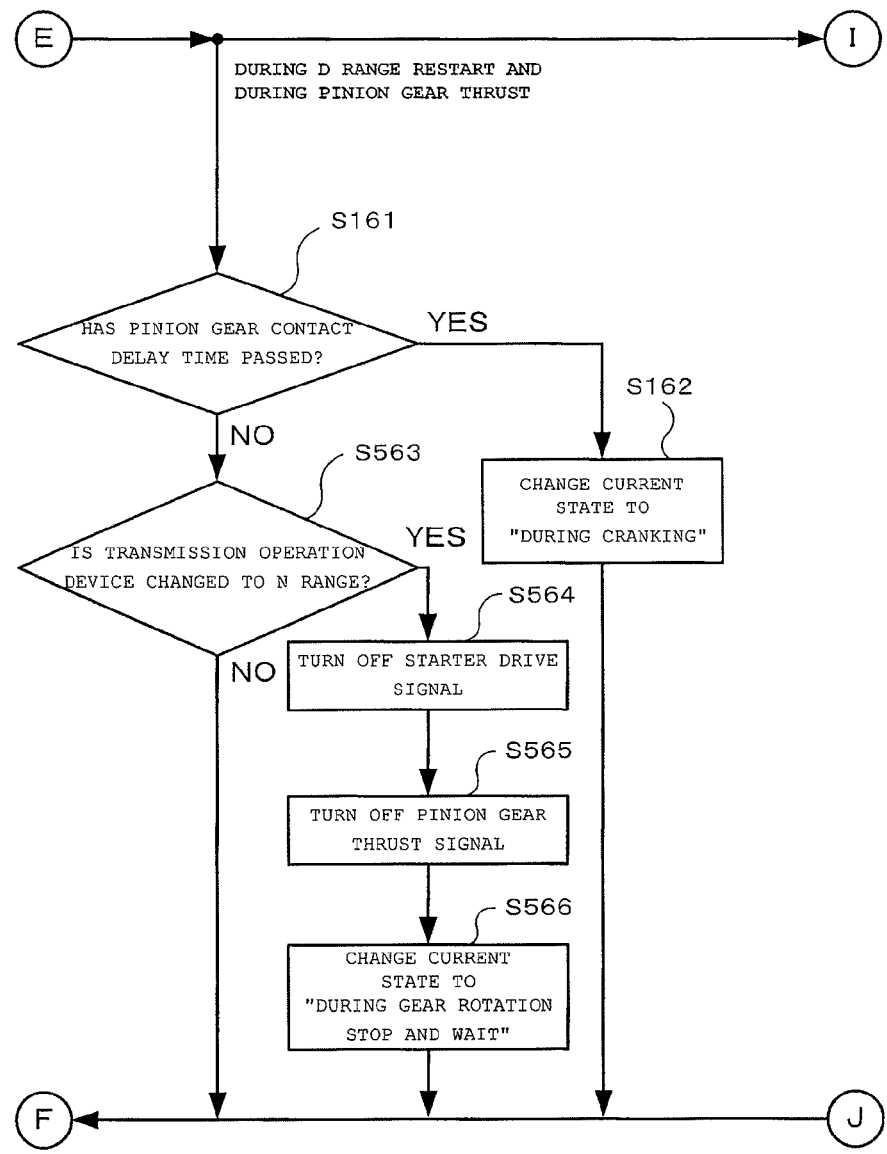
FIG. 28 is a flowchart illustrating an operation of the controller according to Embodiment 6 of the present invention.
Figure 29:
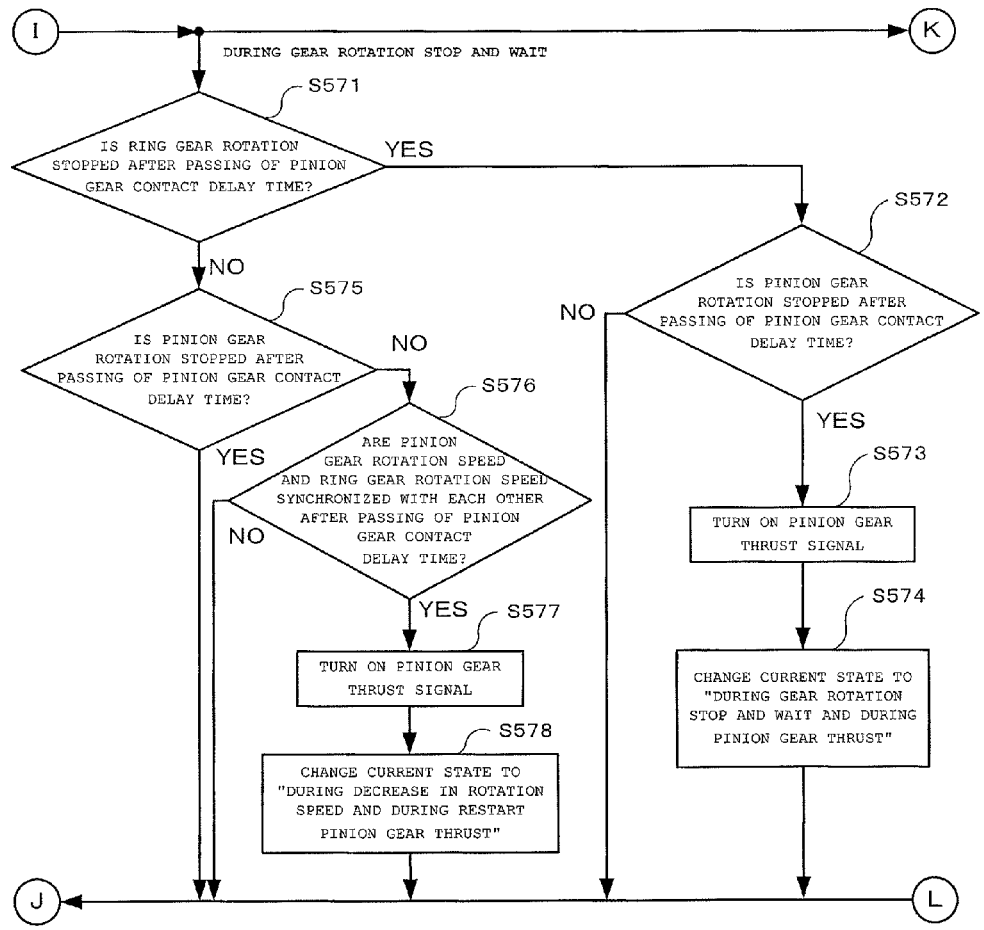
FIG. 29 is a flowchart illustrating an operation of the controller according to Embodiment 6 of the present invention.
Figure 30:
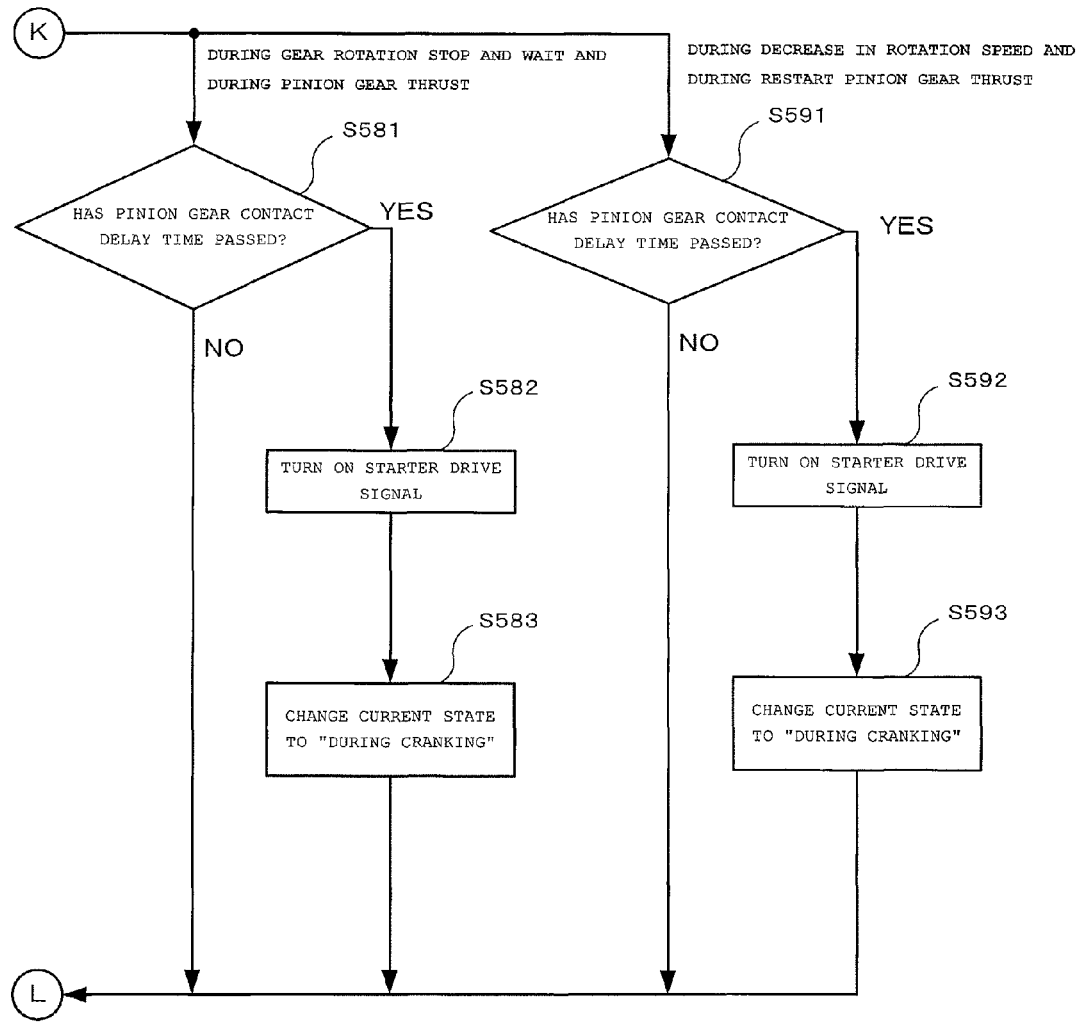
FIG. 30 is a flowchart illustrating an operation of the controller according to Embodiment 6 of the present invention.
Figure 31:
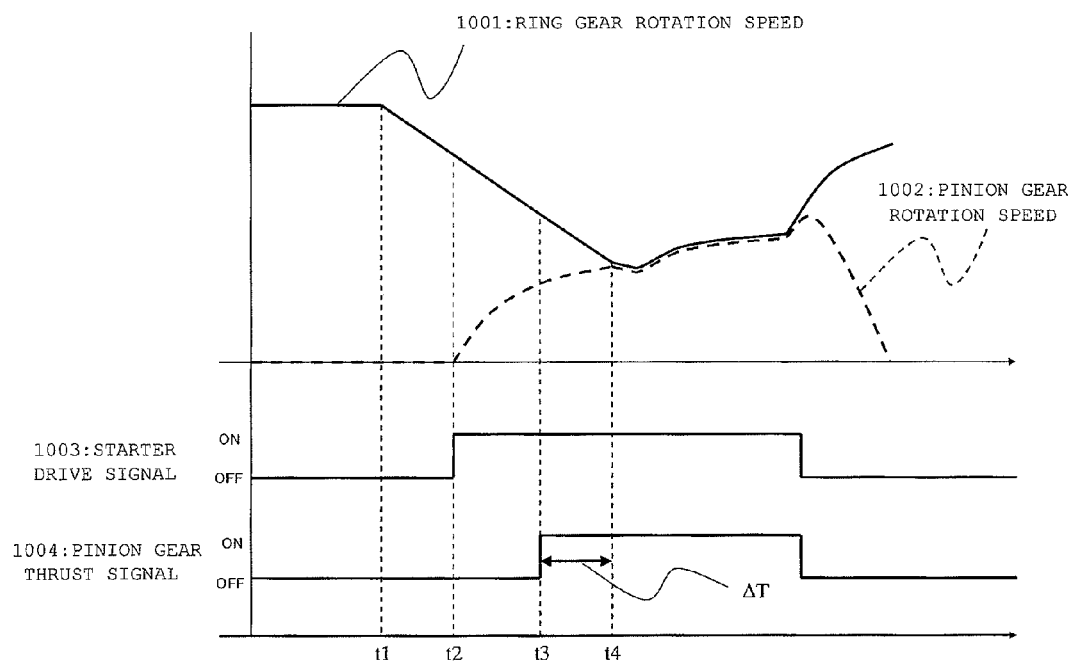
FIG. 31 is a timing chart illustrating operation timings of a conventional device as illustrated in Japanese Patent No. 4214401.
Figure 32:
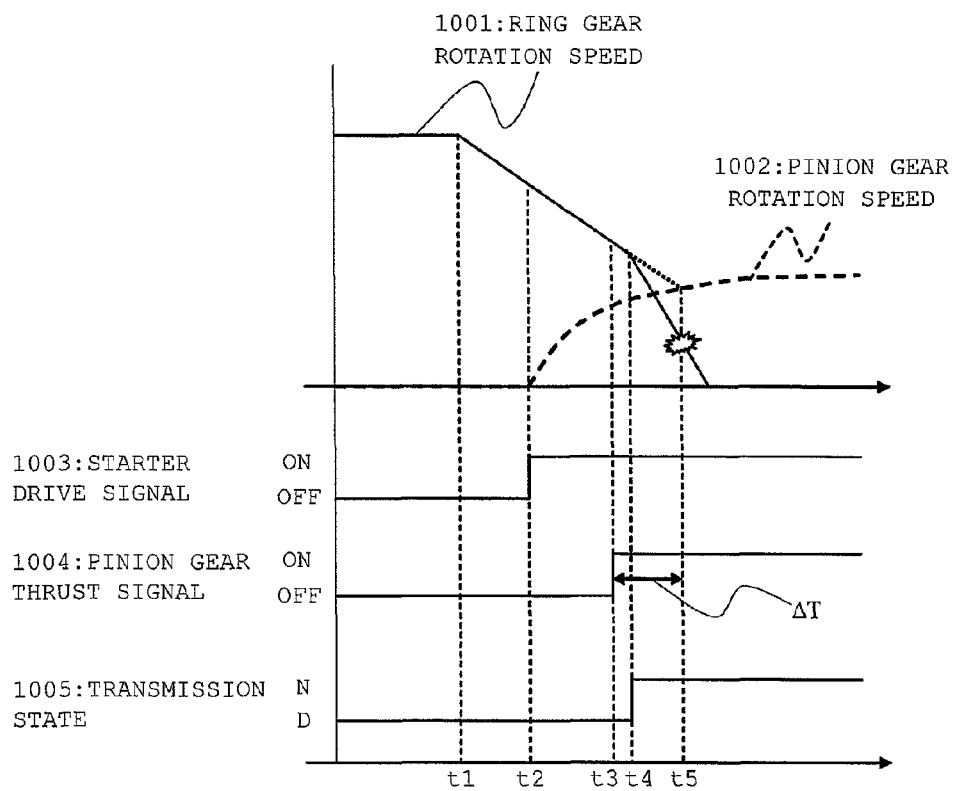
FIG. 32 is a timing chart illustrating operation timings of the conventional device as illustrated in Japanese Patent No. 4214401.

FIGS. 27 to 30 are flowcharts illustrating the operation of the controller 100 according to Embodiment 6 of the present invention. Note that FIG. 27 is connected with FIG. 8 of Embodiment 1 at the nodes C and D. In addition, FIGS. 27 and 28 are connected with each other at the nodes E and F. Further, FIGS. 28 and 29 are connected with each other at the nodes I and J. Still further, FIGS. 29 and 30 are connected with each other at the nodes K and L.

If the current state is "during D range restart", the controller 100 checks whether or not the driver has changed the transmission operation device 3 to the N range in Step S151 of FIG. 27. If the transmission operation device 3 is not changed to the N range, the process flow goes to Step S152. The operation in the case where the transmission operation device 3 is not changed to the N range is the same as that of Embodiment 1.

On the contrary, if the transmission operation device 3 is changed to the N range, the process flow of the controller 100 goes to Step S556. In Step S556, the controller 100 turns off the starter drive signal 100a, and the process flow goes to Step S557. In Step S557, the controller 100 changes the current state to "during gear rotation stop and wait", and the current task process is finished. Then, the process flow goes to Step S100 after a constant period of time.

If the current state is "during D range restart and during pinion gear thrust", the controller 100 checks whether or not the pinion gear abutment delay time has passed in Step S161 of FIG. 28. If the pinion gear abutment delay time has passed, the process flow goes to Step S162. In Step S162, the controller 100 changes the current state to "during cranking", and the current task process is finished. Then, the process flow goes to Step S100 after a constant period of time.

On the contrary, if the pinion gear abutment delay time has not passed, the process flow of the controller 100 goes to Step S563. In Step S563, the controller 100 checks whether or not the driver has changed the transmission operation device 3 to the N range. In this case, if the transmission operation device 3 is not changed to the N range, the controller 100 finishes the current task process. Then, the process flow goes to Step S100 after a constant period of time.

In Step S563, if the transmission operation device 3 is changed to the N range, the process flow of the controller 100 goes to Steps S564 and S565. In Steps S564 and S565, the controller 100 turns off the starter drive signal 100a and turns off the pinion gear thrust signal 100b. Then, the process flow goes to Step S566. In Step S566, the controller 100 changes the current state to "during gear rotation stop and wait", and the current task process is finished. Then, the process flow goes to Step S100 after a constant period of time.

If the current state is "during gear rotation stop and wait", the controller 100 checks in Step S571 of FIG. 29 whether or not it is predicted that the rotation of the ring gear 4 is stopped after passing of the pinion gear abutment delay time. If it is predicted that the rotation of the ring gear 4 is stopped, the process flow goes to Step S572.

In Step S572, the controller 100 checks whether or not it is predicted that the rotation of the pinion gear 5 is stopped after passing of the pinion gear abutment delay time. In this case, if it is not predicted that the rotation of the pinion gear 5 is stopped (or if it is predicted that the rotation is not stopped) after passing of the pinion gear abutment delay time, the controller 100 finishes the current task process. Then, the process flow goes to Step S100 after a constant period of time. On the contrary, if it is predicted that the rotation of the pinion gear 5 is stopped after passing of the pinion gear abutment delay time, the process flow of the controller 100 goes to Step S573.

In Step S573, the controller 100 turns on the pinion gear thrust signal 100b, and the process flow goes to Step S574. In Step S574, the controller 100 changes the current state to "during gear rotation stop and wait and during pinion gear thrust" and finishes the current task process. Then, the process flow goes to Step S100 after a constant period of time.

In addition, in Step S571, if it is not predicted that the rotation of the ring gear 4 is stopped (or if it is predicted that the rotation is not stopped), the process flow of the controller 100 goes to Step S575. In Step S575, the controller 100 checks whether or not it is predicted that the rotation of the pinion gear 5 is stopped after passing of the pinion gear abutment delay time. In this case, if it is predicted that the rotation of the pinion gear 5 is stopped, the controller 100 finishes the current task process. Then, the process flow goes to Step S100 after a constant period of time. On the contrary, if it is not predicted that the rotation of the pinion gear 5 is stopped (or if it is predicted that the rotation is not stopped), the process flow of the controller 100 goes to Step S576.

In Step S576, the controller 100 checks whether or not the rotation speed of the pinion gear 5 and the rotation speed of the ring gear 4 are synchronized with each other after passing of the pinion gear abutment delay time. In this case, if the rotation speed of the pinion gear 5 and the rotation speed of the ring gear 4 are not synchronized with each other after passing of the pinion gear abutment delay time, the controller 100 finishes the current task process. Then, the process flow goes to Step S100 after a constant period of time. On the contrary, if the rotation speed of the pinion gear 5 and the rotation speed of the ring gear 4 are synchronized with each other after passing of the pinion gear abutment delay time, the process flow of the controller 100 goes to Step S577.

In Step S577, the controller 100 turns on the pinion gear thrust signal 100b, and the process flow goes to Step S578. In Step S578, the controller 100 changes the current state to "during decrease in rotation speed and during restart pinion gear thrust" and finishes the current task process. Then, the process flow goes to Step S100 after a constant period of time.

If the current state is "during gear rotation stop and wait and during pinion gear thrust", the controller 100 checks whether or not the pinion gear abutment delay time has passed in Step S581 of FIG. 30. If the pinion gear abutment delay time has not passed, the current task process is finished, and the process flow goes to Step S100 after a constant period of time.

On the contrary, if the pinion gear abutment delay time has passed, the process flow of the controller 100 goes to Step S582. In Step S582, the controller 100 turns on the starter drive signal 100a, and the process flow goes to Step S583. In Step S583, the controller 100 changes the current state to "during cranking", the current task process is finished, and the process flow goes to Step S100 after a constant period of time.

If the current state is "during decrease in rotation speed and during restart pinion gear thrust", the controller 100 checks whether or not the pinion gear abutment delay time has passed in Step S591 of FIG. 30. If the pinion gear abutment delay time has not passed, the current task process is finished, and the process flow goes to Step S100 after a constant period of time. On the contrary, if the pinion gear abutment delay time has passed, the process flow of the controller 100 goes to Step S592.

In Step S592, the controller 100 turns on the starter drive signal 100a, and the process flow goes to Step S593. In Step S593, the controller 100 changes the current state to "during cranking", the current task process is finished, and the process flow goes to Step S100 after a constant period of time. Other operations are the same as those of Embodiment 1.

Here, similarly to Embodiment 1, the pinion gear abutment delay time can be determined in an experimental manner in advance. For instance, it is possible to make settings so that the pinion gear thrust change quantity can be detected and to define time necessary for the pinion gear thrust change quantity to become constant after the pinion gear thrust signal 100b is input as the pinion gear abutment delay time $\Delta T$. In addition, the pinion gear rotation speed can be estimated based on the pinion gear rotation speed when the starter motor drive is stopped and the lapse time from the starter motor drive stop time point by referring to the map as illustrated in FIG. 23. In this way, the pinion gear rotation speed $N_P(\Delta T)$ after the pinion gear abutment delay time $\Delta T$ has passed can be estimated.

In addition, if the speed decrease amount of the ring gear rotation speed when the engine is stopped is determined by experiment in advance and is stored in the controller 100 in advance, a ring gear rotation speed $N_E(\Delta T)$ after passing of the pinion gear abutment delay time $\Delta T$ can be estimated from the current ring gear rotation speed. If the thrusting of the pinion gear 5 is started when the pinion gear rotation speed $N_P(\Delta T)$ after passing of the pinion gear abutment delay time $\Delta T$ becomes equal to the ring gear rotation speed $N_E(\Delta T)$ after passing of the pinion gear abutment delay time $\Delta T$, the rotation speed can be synchronized between the pinion gear 5 and the ring gear 4 at the timing when the pinion gear 5 and the ring gear 4 abut against each other.

According to the automatic stop and restart device for an engine of Embodiment 6 described above, if the pinion gear 5 and the ring gear 4 cannot engage with each other when the transmission operation is performed in the engine restart process during the automatic engine stop, the controller 100 stops the engine restart process so as to stop driving the starter motor 11 and separates the pinion gear 5 from the ring gear 4. Then, if it is predicted that the pinion gear rotation speed and the ring gear rotation speed are synchronized with each other during the period in which the pinion gear rotation speed and the ring gear rotation speed are decreasing, the controller 100 controls the pinion gear 5 to abut against and engage with the ring gear 4. Thus, time necessary for restarting the engine 1 can be further shortened.

What is claimed is:

1. An automatic stop and restart device for an engine that is disposed in a start and transmission system of a vehicle which comprises:

a transmission for changing gears to transmit power of the engine to driving wheels of the vehicle;

a transmission operation device for receiving an external transmission operation to operate a transmission state of the transmission;

a ring gear that is provided to a crank shaft of the engine, a starter motor for starting the engine;

a pinion gear that is capable of approaching and separating from the ring gear and is driven by the starter motor to rotate;

pinion gear thrust means for thrusting the pinion gear to the ring gear so that the pinion gear engages with the ring gear to crank the engine; and ring gear rotation speed detection means for detecting a ring gear rotation speed, the automatic stop and restart device comprising a controller which comprises transmission state determination means for determining whether the transmission is in a drive range or in a non-drive range, the controller performing an automatic stop process for the engine if a predetermined automatic engine stop condition is satisfied, and a restart process for the engine by controlling drive of the starter motor and the pinion gear thrust means if a predetermined restart condition is satisfied after the predetermined automatic engine stop condition is satisfied, wherein, if the transmission operation device is changed from the drive range to the non-drive range during the restart process for the engine after the predetermined restart condition is satisfied in the automatic stop process for the engine, the controller maintains the transmission to be in the drive range, and changes the transmission to the non-drive range after the restart process for the engine is finished.

* * * * *